United States Patent
Kwon et al.

(10) Patent No.: US 10,566,638 B2
(45) Date of Patent: Feb. 18, 2020

(54) RADIOLYTIC ELECTROCHEMICAL GENERATOR

(71) Applicant: The Curators of the University of Missouri, Columbia, MO (US)

(72) Inventors: Jae Wan Kwon, Columbia, MO (US); Baek Hyun Kim, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 832 days.

(21) Appl. No.: 14/762,869

(22) PCT Filed: Jan. 31, 2014

(86) PCT No.: PCT/US2014/014262
§ 371 (c)(1),
(2) Date: Jul. 23, 2015

(87) PCT Pub. No.: WO2014/121121
PCT Pub. Date: Aug. 7, 2014

(65) Prior Publication Data
US 2015/0364781 A1 Dec. 17, 2015

Related U.S. Application Data

(60) Provisional application No. 61/849,660, filed on Jan. 31, 2013.

(51) Int. Cl.
*H01M 8/06* (2016.01)
*H01M 14/00* (2006.01)

(52) U.S. Cl.
CPC ............. *H01M 8/06* (2013.01); *H01M 14/00* (2013.01)

(58) Field of Classification Search
CPC ..... C01B 13/0207; C01B 3/042; C25B 1/003; H01M 10/00; H01M 8/06
See application file for complete search history.

(56) References Cited

U.S. PATENT DOCUMENTS 4,090,933 A    5/1978   Nozik
4,437,954 A    3/1984   Sammells et al.
(Continued)

FOREIGN PATENT DOCUMENTS

CN      101070602 A    11/2007
JP      2003-275602 A    9/2003
(Continued)

OTHER PUBLICATIONS

English Tanslation of JP 2003-275602.
(Continued)

*Primary Examiner* — Adam A Arciero
(74) *Attorney, Agent, or Firm* — Thompson Coburn LLP; Steven M. Ritchey

(57) ABSTRACT

A radiolytic electrochemical system that comprises a cathode, an anode that comprises a semiconductor, an aqueous electrolyte solution disposed between the cathode and anode, and ionizing radiation, wherein the ionizing radiation splits water molecules and forms solvated free radicals that migrate to the anode or cathode, depending upon a radical's charge, and participate in redox reactions at the anode and cathode thereby producing electrical current capable of performing work when the anode and cathode are electrically connected.

9 Claims, 21 Drawing Sheets

(56) References Cited

U.S. PATENT DOCUMENTS

| | | | |
|---|---|---|---|
| 4,793,910 | A | 12/1988 | Smotkin et al. |
| 4,816,352 | A | 3/1989 | Gordon |
| 6,991,874 | B1 | 1/2006 | Mohwald et al. |
| 8,073,097 | B2 | 12/2011 | Tsang et al. |
| 8,094,771 | B2 | 1/2012 | Tsang et al. |
| 8,303,791 | B2 | 11/2012 | Basker et al. |
| 8,691,404 | B2 | 4/2014 | Kwon et al. |
| 2002/0022160 | A1* | 2/2002 | Schmidt ............... B01D 53/326 429/5 |
| 2003/0121543 | A1* | 7/2003 | Gratzel ................. B01J 35/002 136/252 |
| 2004/0197641 | A1 | 10/2004 | Visco et al. |
| 2004/0250848 | A1* | 12/2004 | Sager ..................... B82Y 10/00 136/252 |
| 2005/0052824 | A1* | 3/2005 | Jyoya ..................... B82Y 30/00 361/321.5 |
| 2006/0210867 | A1 | 9/2006 | Kenis et al. |
| 2007/0207350 | A1 | 9/2007 | Highgate |
| 2011/0274233 | A1 | 11/2011 | Tsang et al. |
| 2012/0305408 | A1* | 12/2012 | Gerken ............... C01B 13/0207 205/630 |

FOREIGN PATENT DOCUMENTS

| | | |
|---|---|---|
| JP | 2007-522438 A | 8/2007 |
| JP | 2012-520466 A | 9/2012 |

OTHER PUBLICATIONS

Extended European Search Report for EP Application 14746704.7 dated Jul. 26, 2016.

Pleskov et al., "Radiation-Electrochemical Oxidation of Water on Semiconductors (TiO2, SrTiO3) Electrodes in Aqueous Electrolyte Solutions", Radiation Physics and Chemistry, Jan. 1, 1985, pp. 17-23, vol. 26, No. 1, Pergamon Press, Oxford, England.

* cited by examiner

RADIOLYTIC ELECTROCHEMICAL GENERATOR

CROSS-REFERENCE TO RELATED APPLICATIONS

This application is a U.S. National Phase application of PCT/US2014/014262, filed on Jan. 31, 2014, which claims the benefit of U.S. Provisional Application No. 61/849,660, filed Jan. 31, 2013, both of which are incorporated herein by reference in their entireties.

BACKGROUND OF INVENTION

Particles emitted from radioisotopes can be used to convert the radiant energy into electricity. Radioisotope energy conversion for power generation has been intensively studied to develop power sources for a wide range of applications from energizing cardiac pacemakers in the human body, to challenging outer planet missions. As compared to various indirect conversion methods collecting the electricity from the secondary energy forms of heat or light generated by radiation, direct conversion methods produce electric power directly from energetic particles. Beta particles can produce electron-hole pairs in semiconductors via their loss of kinetic energy and can contribute to the generation of electric power. Although potential applicability of radioisotopes in portable power sources that do not require recharging seems very attractive, it has been reported that only a small portion of the whole radiation energy can be converted into electrical energy. Moreover, most betavoltaic cells suffer from serious radiation damage to the lattice structures of semiconductors and subsequent performance degradation due to the high kinetic energy of the beta particles. Alternatively, to minimize lattice damage in semiconductors, wide band gap materials are typically used. However, radiation-resistive materials, such as SiC and GaN, still show very low energy conversion efficiencies. Very little improvements have been made even after vigorous research on various improvement methods utilizing porous structures, inverted pyramidal cavities, and three dimensional silicon pillar structures to increase rectifying junction areas. In view of the foregoing, a need still exists for a more efficient method and device for producing electrical power from radiation.

SUMMARY OF INVENTION

In one embodiment, the invention is directed to a radiolytic electrochemical system comprising:
(a) a cathode;
(b) an anode that comprises:
 (i) a semiconductor component; and
 (ii) a conduction component comprising an ohmic metal in contact with the semiconductor component thereby forming a non-rectifying metal-semiconductor junction; and
(c) an aqueous electrolyte solution in contact with the cathode and the anode, but not the conduction component of the anode, wherein solvated free radical ions are formed in the aqueous electrolyte solution when it is subjected to ionizing radiation of sufficient energy to split water molecules therein; and
(d) ionizing radiation, some of which splits water molecules in the aqueous electrolyte solution to form positively and negatively charged free radical ions that are solvated in the aqueous electrolyte solution; and wherein negatively charged solvated free radical ions are released from their surrounding water molecules and participate in redox reactions at the cathode/solution interface and positively charged solvated free radical ions are released from their surrounding water molecules and participate in redox reactions at the anode/solution interface thereby producing electrical current capable of performing work when the anode and cathode are electrically connected.

In another embodiment, the invention is directed to a radiolytic electrochemical system comprising:
(a) a cathode, wherein the cathode comprises a cathode metal selected from the group consisting of Pt, Au, Pd, Fe, Cr, Co, Ni, Ag, Ti, Ru, Cu, Mo, and Ir, alloys thereof, and combinations of the foregoing metallic elements and/or alloys, and wherein the cathode has a nanoscale morphology that comprises nanopores that have an average diameter in a range about 10 nm to about 500 nm and the nanopores are spaced a distance apart that is in a range of about 10 nm to about 500 nm;
(b) an anode that comprises:
 (i) a semiconductor component, wherein the semiconductor component has a nanoscale morphology that comprises nanopores that have an average diameter in a range about 10 nm to about 500 nm, and wherein the semiconductor nanopores are spaced a distance apart that is in a range of about 10 nm to about 500 µm, and wherein the semiconductor component structure is nanowires or nanotubes, and wherein the semiconductor component comprises a single crystal large band gap semiconductor material selected from the group consisting of $TiO_2$, Si, SiC, GaN, GaAs, ZnO, $WO_3$, $SnO_2$, $SrTiO_3$, $Fe_2O_3$, CdS, ZnS, CdSe, GaP, $MoS_2$, ZnS, $ZrO_2$, and $Ce_2O_3$, and combinations thereof;
 (ii) a Schottky component comprising a Schottky metal in contact with the semiconductor component thereby forming a rectifying metal-semiconductor junction, wherein the Schottky metal is selected from the group consisting of Pt, Au, Pd, Fe, Co, Cr, Ni, Ag, Ti, Ru, Cu, Mo, Ir, and Rh, alloys thereof, and combinations of the foregoing metallic elements and/or alloys, and wherein the thickness of the Schottky component is in a range of about 1 nm to about 100 nm, and wherein the Schottky component has a nanoscale morphology that comprises nanopores that have an average diameter in a range about 10 nm to about 500 nm and the nanopores are spaced a distance apart that is in a range of about 10 nm to about 500 nm; and
 (iii) a conduction component comprising an ohmic metal in contact with the semiconductor component thereby forming a non-rectifying metal-semiconductor junction, wherein the ohmic metal is selected from the group consisting of Al, Ag, Fe, Cr, Ti, Ni, Au, Pt, Pb, Mo, and Cu, alloys thereof, and combinations of the foregoing metallic elements and/or alloys; and
(c) an aqueous electrolyte solution in contact with the cathode and the anode, but not the conduction component of the anode, wherein solvated free radical ions are formed in the aqueous electrolyte solution when it is subjected to ionizing radiation of sufficient energy to split water molecules therein, and wherein the aqueous solution has a basic pH in the event a n-type semiconductor and/or $n^+$-type semiconductor is in contact with the aqueous electrolyte solution or an acid pH in the event a p-type semiconductor and/or $p^+$-type semiconductor is in contact with the aqueous electrolyte solution thereby forming a stable rectifying junction at the semiconductor component-solution interface, and wherein the aqueous electrolyte solution further comprises a redox compound that provides a redox couple that participates in the redox reactions are conducted at the cathode/solution interface and the anode/solution interface thereby reducing or eliminating the production of one or more gaseous products, wherein the redox compound and the redox couple, respectively, are selected from the group consisting of $ZnSO_4$ [$Zn^+|Zn^{2+}$], $CoSO_4$ [$Co^+|Co^{2+}$], $CdSO_4$ [$Cd^+|Cd^{2+}$], $TlSO_4$ [$Tl^0|Tl^+$], $Pb(ClO_4)_2$ [$Pb^+|Pb^{2+}$], $NiSO_4$ [$Ni^+|Ni^{2+}$], and $Cr(ClO_4)_3$ [$Cr^+|Cr^{3+}$]; and (d) ionizing radiation, some of which splits water molecules in the aqueous electrolyte solution to form positively and negatively charged free radical ions that are solvated in the aqueous electrolyte solution, wherein the radiation source is a beta particle emitting radioisotope selected from the group consisting of $^{63}Ni$, $^{90}Sr$, $^{35}S$, $^{204}Tl$, and $^3H$, $^{148}Gd$, and $^{137}Cs$ or an alpha particle emitting radioisotope selected from the group consisting of $^{210}Po$, $^{244}Cm$, $^{238}Pu$, and $^{241}Am$, and wherein the ionizing radiation is from a radiation source that is encapsulated by a protective layer and at least a portion of the protective layer is in contact with the aqueous electrolyte solution, wherein the protective layer prevents chemical reactions between the radiation and the aqueous electrolyte solution, and wherein the radiation source is spaced from the anode a distance that is at least sufficient to prevent or limit lattice damage to the semiconductor component and no greater than about the distance the ionizing radiation can travel in the aqueous electrolyte solution; and wherein negatively charged solvated free radical ions are released from their surrounding water molecules and participate in redox reactions at the cathode/solution interface and positively charged solvated free radical ions are released from their surrounding water molecules and participate in redox reactions at the anode/solution interface thereby producing electrical current capable of performing work when the anode and cathode are electrically connected.

In another embodiment, the invention is directed to a radiolytic electrochemical system comprising a cathode, an anode that comprises a semiconductor, an aqueous electrolyte solution disposed between the cathode and anode, and ionizing radiation, wherein the ionizing radiation splits water molecules in the solution and forms solvated free radicals that migrate to the anode or cathode, depending upon a radical's charge, and participate in redox reactions at the anode and cathode thereby producing electrical current capable of performing work when the anode and cathode are electrically connected.

In another embodiment, the invention is directed to a method of conducting a radiolytic electrochemical reaction comprising operating any of the foregoing radiolytic electrochemical systems with the anode and cathode electrically connected.

In yet another embodiment, the invention is directed to a method of generating electrical current to perform work comprising operating any of the foregoing radiolytic electrochemical systems with the anode and cathode electrically connected.

In still another embodiment, the invention is directed to a method of detecting the presence of radioisotopes comprising generating an electrical current with any of the foregoing radiolytic electrical systems with the anode and cathode electrically connected, wherein the electrical current has a magnitude that is indicative of radiation source's presence, strength, location, or a combination thereof.

Further, in one embodiment the invention is directed to a method for producing hydrogen gas comprising conducting a radiolytic electrochemical reaction comprising operating any of the foregoing radiolytic electrochemical systems with the anode and cathode electrically connected and collecting hydrogen gas produced during the redox reactions.

DETAILED DESCRIPTION OF INVENTION

Figure 1:
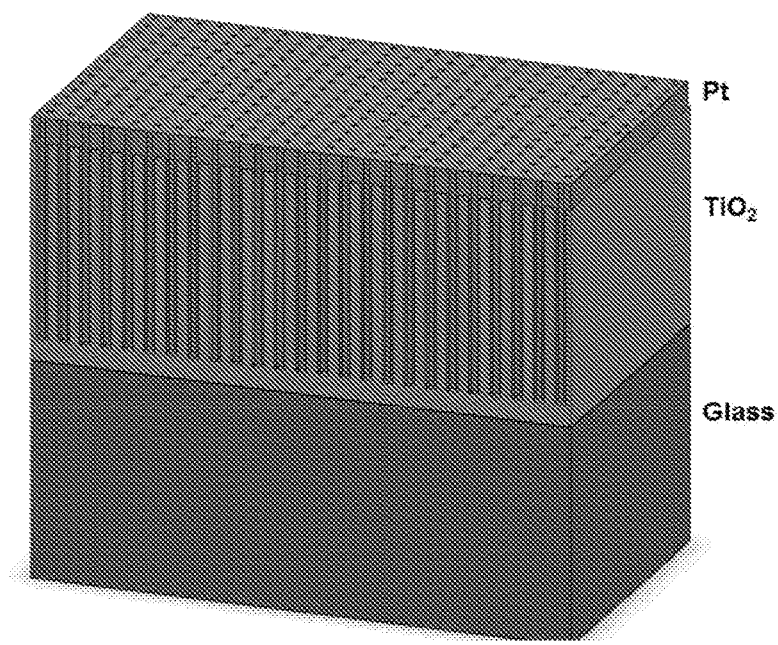
FIG. 1 is cross-sectional schematic illustration of an anode embodiment of the present invention comprising a nanoporous $TiO_2$ semiconductor prepared by anodising and thermally oxidising a thin Ti film deposited on a glass substrate and a thin platinum film (Schottky component) deposited on top of the $TiO_2$ nanopores using an RF sputtering system.

The field of conventional energy conversion using radioisotopes has almost exclusively focused on solid-state materials. Although, thus far, there has been no method for completely avoiding radiation damage to semiconductors, the use of a liquid-phase material has been introduced as a means to reduce or eliminate radiation damage and related structural defect problems because liquid-phase material efficiently absorbs the kinetic energy of ionizing radiation such as beta particles.

In fact, relatively large amounts of radiation energy can be absorbed by water. When radiation energy is absorbed by an aqueous solution, free radicals (e.g., $e_{aq}^-$, .OH, H., $HO_2$.) may be produced through radiolytic interactions. These free radicals may result in the generation of molecular by-products, such as $H_2O_2$ and $H_2$. The present invention utilizes the foregoing for the generation of electricity using a device that separates the radiolytic current from the free radicals by splitting the water.

Herein, it is demonstrated that liquids can be excellent media for effective energy conversion from radioisotopes. It is also shown that free radicals in liquid, which are continuously generated by ionizing radiation, can be utilized for electrical energy generation.

Radiolytic Electrochemical System

In one embodiment, the radiolytic electrochemical system comprises a cathode, an anode that comprises a semiconductor, an aqueous electrolyte solution disposed between the cathode and anode, and ionizing radiation, wherein the ionizing radiation splits water molecules in the solution and forms solvated free radicals that migrate to the anode or cathode, depending upon a radical's charge, and participate in redox reactions at the anode and cathode thereby producing electrical current capable of performing work when the anode and cathode are electrically connected.

In another embodiment, the radiolytic electrochemical system comprises:
(a) a cathode;
(b) an anode that comprises:
   (i) a semiconductor component; and
   (ii) a conduction component comprising an ohmic metal in contact with the semiconductor component thereby forming a non-rectifying metal-semiconductor junction; and
(c) an aqueous electrolyte solution in contact with the cathode and the anode, but not the conduction component of the anode, wherein solvated free radical ions are formed in the aqueous electrolyte solution when it is subjected to ionizing radiation of sufficient energy to split water molecules therein; and
(d) ionizing radiation, some of which splits water molecules in the aqueous electrolyte solution to form positively and negatively charged free radical ions that are solvated in the aqueous electrolyte solution; and
wherein negatively charged solvated free radical ions are released from their surrounding water molecules and participate in redox reactions at the cathode/solution interface and positively charged solvated free radical ions are released from their surrounding water molecules and participate in redox reactions at the anode/solution interface thereby producing electrical current capable of performing work when the anode and cathode are electrically connected.

Semiconductor Component

Advantageously, in certain embodiments some of the ionizing radiation forms electron-hole pairs in the semiconductor component that separate with holes migrating to, and participating in, the redox reactions at the anode/solution interface and electrons migrating to, and participating in, the redox reactions at the cathode/solution interface thereby contributing to the electrical current. Generally, to facilitate such formation of electron-hole pairs and the transport electrons and holes, the semiconductor component has a thickness that is in a range of about 10 nm to about 500 μm.

Nanoscale Morphology

In certain embodiments, the semiconductor component has a nanoscale morphology. Among other things, the nanoscale morphology tends to be advantageous simply because it provides more surface area and, thus, reaction sites for redox reactions. In one such embodiment, the nanoscale morphology comprises nanopores that have an average diameter in a range about 10 nm to about 500 nm. Additionally, the semiconductor nanopores may be spaced a distance apart that is in a range of about 10 nm to about 500 μm.

Semiconductor Component Structure

The above-described nanoscale morphology may be accomplished through any appropriate method and/or structure. In certain embodiments, the radiolytic, the semiconductor component comprises a structure selected from the group consisting of nanowires, nanorods, nanotubes, sintered nanoparticles, nanosheets, nanometer-thick films, and combinations thereof, and the semiconductor nanopores correspond to the separation between said structure. Typically, nanowires or nanotubes are selected.

An exemplary semiconductor component structure is nanowires that are formed, for example, by depositing a metal film on a substrate by RF sputtering, patterning the metal film by, for example, etching, oxidizing the metal to result in a patterned semiconductor oxide.

Semiconductor Material

When ionizing radiation passes through the semiconductor component, it produces electron-hole pairs in the semiconductor component, some of which recombine but others separate and migrate due to the built in potential at the anode/liquid interface. The holes tend to move to the anode/liquid interface and react with redox couples of water molecules. Whereas the electrons tend to move through the semiconductor component to the conduction component and through to the cathode and react with redox couples of water molecules.

Typically, it is desirable for the semiconductor component to comprise a large band gap semiconductor material. It is also typically desirable for the semiconductor component to comprise a single crystal material. That said, polycrystalline materials are acceptable. In certain embodiments, the semiconductor component consists of a single crystal large band gap semiconductor material. Exemplary large band gap semiconductor material is selected from the group consisting of $TiO_2$, Si, SiC, GaN, GaAs, ZnO, $WO_3$, $SnO_2$, $SrTiO_3$, $Fe_2O_3$, CdS, ZnS, CdSe, GaP, $MoS_2$, ZnS, $ZrO_2$, and $Ce_2O_3$, and combinations thereof. In still further embodiments, the single crystal large band gap semiconductor material is an oxide such as $TiO_2$.

The semiconductor component is selected from the group consisting of intrinsic semiconductor (i), n-type semiconductor (n), $n^+$-type semiconductor ($n^+$), p-type semiconductor (p), $p^+$-type semiconductor ($p^+$), and combinations thereof.

Particularly desirable combinations include structures selected from the group consisting of n, p, n-p, p-$p^+$, n-$n^+$, n-i-p, and $n^+$-n-i-p-$p^+$.

Schottky Component

The radiolytic electrochemical system may further comprise a Schottky component comprising a Schottky metal in contact with the semiconductor component thereby forming a rectifying metal-semiconductor junction. Exemplary Schottky metals include Pt, Au, Pd, Fe, Co, Cr, Ni, Ag, Ti, Ru, Cu, Mo, Ir, and Rh, alloys thereof, and combinations of the foregoing metallic elements and/or alloys. In certain embodiments, the Schottky metal comprises one or more noble metal elements. In another embodiment, the Schottky metal is Pt.

In certain embodiments, the Schottky component has a nanoscale morphology that creates localized surface plasmons when the Schottky component is subjected to some of the ionizing radiation, wherein some of the plasmons form electron-hole pairs in the Schottky component that separate. The excited electrons transiently occupying normally empty states in the Schottky metal conduction band above the Fermi energy level and most of the excited electrons are sufficiently energetic to enter the conduction band of the semiconductor component. Additionally, it is believed that the ionizing radiation deposits energy through the depletion region near the Schottky metal-semiconductor junction, and the electric field separates the electron-hole pairs in different directions (electrons toward the semiconductor and holes toward the Schottky metal-liquid interface, which results in a potential difference between the Schottky and ohmic).

Additionally, the Schottky component preferably has a thickness that allows for holes to migrate to, and participate in, the redox reactions at the anode/solution interface and electrons to migrate (via the semiconductor component and the conduction component) to, and participate in, the redox reactions at the cathode/solution interface thereby contributing to the electrical current. Appropriate thicknesses of the Schottky component tend to be in a range of about 1 nm to about 100 nm.

Another desirable effect associated with the formation of plasmons is that some of the plasmons assist in the release of the positively charged solvated free radical ions from their surrounding water molecules for participation in the redox reactions at the anode/solution interface thereby contributing to the electrical current. For example, the nanoscale morphology of the Schottky component may comprise nanopores that have diameters that provide optimum surface Plasmon resonance within a wavelength range of about 100 nm to about 800 nm. This is typically achieved with nanopores that have an average diameter in a range about 10 nm to about 500 nm. Also, the nanopores are typically spaced a distance apart that is in a range of about 10 nm to about 500 nm.

Conduction Component

In certain embodiments, the ohmic metal is selected from the group consisting of Al, Ag, Fe, Cr, Ti, Ni, Au, Pt, Pb, Mo, and Cu, alloys thereof, and combinations of the foregoing metallic elements and/or alloys. In certain embodiments, the conduction component is a foil, sheet, or plate, which may be the base upon which the semiconductor component is deposited. Alternatively, the conduction component may be a film deposited on a substrate and the semiconductor component is deposited on the conduction component film.

Cathode

In certain embodiments, the cathode comprises a cathode metal selected from the group consisting of Pt, Au, Pd, Fe, Cr, Co, Ni, Ag, Ti, Ru, Cu, Mo, and Ir, alloys thereof, and combinations of the foregoing metallic elements and/or alloys. In other embodiments, the cathode comprises noble metal elements. In still other embodiments, the cathode metal is Pt.

In certain embodiments, the cathode has a nanoscale morphology that creates localized surface plasmons when the cathode is subjected to some of the ionizing radiation, wherein some of the plasmons assist in the release of the negatively charged solvated free radical ions from their surrounding water molecules for participation in the redox reactions at the cathode/solution interface thereby contributing to the electrical current. This is typically achieved with nanopores that have an average diameter in a range about 10 nm to about 500 nm. Also, the nanopores are typically spaced a distance apart that is in a range of about 10 nm to about 500 nm.

Aqueous Electrolyte Solution

In certain embodiments, the aqueous electrolyte solution is selected to have a pH such that a stable rectifying junction at the anode (semiconductor component)-solution interface is formed. For a basic electrolyte solution, the chemical energy of redox couple is changed by $E=E_0-pH*0.059$ eV. For example, $2H++2e-\rightarrow H2$ (g) has 0 V at pH=0 but when pH=14, the chemical energy is changed from 0V to −0.826V. Which means that a p-type semiconductor cannot form the Schottky contact (rectifying junction) between the semiconductor-liquid interface but an n-type semiconductor can form a more stable Schottky contact. As such, the aqueous solution has a basic pH in the event an n-type semiconductor and/or $n^+$-type semiconductor is in contact with the aqueous electrolyte solution. Alternatively, the aqueous electrolyte solution has an acid pH in the event a p-type semiconductor and/or p$^+$-type semiconductor is in contact with the aqueous electrolyte solution.

In certain embodiments, the basic solution comprises an alkaline electrolyte selected from the group consisting of KOH, NaOH, and mixtures thereof, and the acidic solution comprises an acidic electrolyte selected from the group consisting of $H_2SO_4$, $HNO_3$, $LiSO_4$, and mixtures thereof. Also, the basic electrolyte is at a concentration in the aqueous electrolyte solution in a range of about 0.1 M to about 5 M, and the acidic electrolyte is at a concentration in the aqueous electrolyte solution in a range of about 0.1 M to about 5 M.

Ionizing Radiation

The ionizing radiation is from a radiation source that comprises one or more radioisotopes that emit from the group consisting of alpha particles, beta particles, neutrons, gamma rays, and combinations thereof. In certain embodiments, the radiation source is a beta particle emitting radioisotope selected from the group consisting of $^{63}$Ni, $^{90}$Sr, $^{35}$S, $^{204}$Tl, and $^3$H, $^{148}$Gd, and $^{137}$Cs. In other embodiments, the radiation source is an alpha particle emitting radioisotope selected from the group consisting of $^{210}$Po, $^{244}$Cm, $^{238}$Pu, and $^{241}$Am.

In-Contact or Internal Radiation Source

In certain embodiments, the system is an electrochemical cell and the ionizing radiation is from a radiation source that is encapsulated by a protective layer and at least a portion of the protective layer is in contact with the aqueous electrolyte solution, wherein the protective layer prevents chemical reactions between the radiation and the aqueous electrolyte solution. In still another embodiment, the electrochemical cell is at least substantially sealed and the cathode, the anode, the encapsulated radiation source, and the aqueous electrolyte solution are within the at least substantially sealed electrochemical cell. The phrase "at least substantially sealed" is intended to, for example, allow for the presence of vents or breathing holes that allow for generated gasses to escape and/or improving the movement of liquid or gas in, out, and/or through the system, cell, or device. Additionally, the terms "electrochemical system" and "electrochemical cell" are not intended to exclude such systems or cells that comprise multiple containers or chambers. For example, a system may comprise a multiplicity of cells. Additionally, a system or cell may comprise a multiplicity of containers or chambers. For example, a system or cell may comprise one or more containers or chambers comprising the anode component(s) and electrolyte solution and one or more containers of chambers comprising the cathode and a different electrolyte solution having, for example, different pH conditions connected by a bridge(s) and/or membrane(s).

In another embodiment, the radiation source is spaced from the anode a distance that is at least sufficient to prevent or limit lattice damage to the semiconductor component and no greater than about the distance the ionizing radiation can travel in the aqueous electrolyte solution. For example, if the radiation source is $^{90}$Sr, it is usually spaced from the anode a distance that is in a range of about 1 mm to about 4 mm. It may be closer to the cathode such as at a distance that is in a range of 0.1 mm to 10 mm.

External Radiation Source

In certain embodiments, the ionizing radiation is from a radiation source that is not in contact with the aqueous electrolyte solution. For example, the anode, and the aqueous electrolyte solution are within a sealed container through which the ionizing radiation from the radiation source passes.

Such external radiation source embodiments allow for a radiolytic electrochemical system that is useful for detecting the presence of radioisotopes. For example, when in the presence of ionizing radiation from an external source, an electrical current may be generated when anode and cathode electrically connected, wherein the electrical current has a magnitude that is indicative of radiation source's presence, strength, location, or a combination thereof.

Substrate Component

In certain embodiments, the radiolytic electrochemical system may further comprise a substrate component in contact with the conduction component, and wherein the conduction component is a layer deposited on the substrate component. The substrate component may be selected from any appropriate material. For example, in some embodiments, the substrate component comprises a substrate material selected from the group consisting of glass, Si, plastic, and metals and alloys thereof, and combinations of the foregoing.

Redox Couple Compound

In certain embodiments, wherein the aqueous electrolyte solution further comprises a redox compound that provides a redox couple that participates in the redox reactions are conducted at the cathode/solution interface and the anode/solution interface thereby reducing or eliminating the production of one or more gaseous products. Exemplary redox compounds and the redox couples, respectively, may be selected from the group consisting of $ZnSO_4$ [$Zn^+|Zn^{2+}$], $CoSO_4$ [$Co^+|Co^{2+}$], $CdSO_4$ [$Cd^+|Cd^{2+}$], $TlSO_4$ [$Tl^0|Tl^+$], $Pb(ClO_4)_2$ [$Pb^+|Pb^{2+}$], $NiSO_4$ [$Ni^+|Ni^{2+}$], and $Cr(ClO_4)_3$ [$Cr^+|Cr^{3+}$]. If present, the redox compound is typically at a concentration in the aqueous electrolyte solution in a range of about 1 µM to about 5 M.

Another Radiolytic Electrochemical System Embodiment

In another embodiment, the radiolytic electrochemical system comprises:

(a) a cathode, wherein the cathode comprises a cathode metal selected from the group consisting of Pt, Au, Pd, Fe, Co, Ni, Ag, Ti, Ru, Cu, Mo, and Ir, alloys thereof, and combinations of the foregoing metallic elements and/or alloys, and wherein the cathode has a nanoscale morphology that comprises nanopores that have an average diameter in a range about 10 nm to about 500 nm and the nanopores are spaced a distance apart that is in a range of about 10 nm to about 500 nm;

(b) an anode that comprises:

(i) a semiconductor component, wherein the semiconductor component has a nanoscale morphology that comprises nanopores that have an average diameter in a range about 10 nm to about 500 nm, and wherein the semiconductor nanopores are spaced a distance apart that is in a range of about 10 nm to about 500 µm, and wherein the semiconductor component structure is nanowires or nanotubes, and wherein the semiconductor component comprises a single crystal large band gap semiconductor material selected from the group consisting of $TiO_2$, Si, SiC, GaN, GaAs, ZnO, $WO_3$, $SnO_2$, $SrTiO_3$, $Fe_2O_3$, CdS, ZnS, CdSe, GaP, $MoS_2$, ZnS, $ZrO_2$, and $Ce_2O_3$, and combinations thereof;

(ii) a Schottky component comprising a Schottky metal in contact with the semiconductor component thereby forming a rectifying metal semiconductor junction, wherein the Schottky metal is selected from the group consisting of Pt, Au, Pd, Fe, Co, Ni, Ag, Ti, Ru, Cu, Mo, Ir, and Rh, alloys thereof, and combinations of the foregoing metallic elements and/or alloys, and wherein the thickness of the Schottky component is in a range of about 1 nm to about 100 nm, and wherein the Schottky component has a nanoscale morphology that comprises nanopores that have an average diameter in a range about 10 nm to about 500 nm and the nanopores are spaced a distance apart that is in a range of about 10 nm to about 500 nm; and (iii) a conduction component comprising an ohmic metal in contact with the semiconductor component thereby forming a non-rectifying metal-semiconductor junction, wherein the ohmic metal is selected from the group consisting of Al, Ag, Ti, Ni, Au, Pt, Pb, Mo, and Cu, alloys thereof, and combinations of the foregoing metallic elements and/or alloys; and (c) an aqueous electrolyte solution in contact with the cathode and the anode, but not the conduction component of the anode, wherein solvated free radical ions are formed in the aqueous electrolyte solution when it is subjected to ionizing radiation of sufficient energy to split water molecules therein, and wherein the aqueous solution has a basic pH in the event a n-type semiconductor and/or n+-type semiconductor is in contact with the aqueous electrolyte solution or an acid pH in the event a p-type semiconductor and/or p+-type semiconductor is in contact with the aqueous electrolyte solution thereby forming a stable rectifying junction at the semiconductor component-solution interface, and wherein the aqueous electrolyte solution further comprises a redox compound that provides a redox couple that participates in the redox reactions are conducted at the cathode/solution interface and the anode/solution interface thereby reducing or eliminating the production of one or more gaseous products, wherein the redox compound and the redox couple, respectively, are selected from the group consisting of $ZnSO_4$ [$Zn^+$|$Zn^{2+}$], $CoSO_4$ [$Co^+$|$Co^{2+}$], $CdSO_4$ [$Cd^+$|$Cd^{2+}$], $TlSO_4$ [$Tl^0$|$Tl^+$], $Pb(ClO_4)_2$ [$Pb^+$|$Pb^{2+}$], $NiSO_4$ [$Ni_+$|$Ni_{2+}$], and $Cr(ClO_4)_3$ [$Cr^+$|$Cr^{3+}$]; and (d) ionizing radiation, some of which splits water molecules in the aqueous electrolyte solution to form positively and negatively charged free radical ions that are solvated in the aqueous electrolyte solution, wherein the radiation source is a beta particle emitting radioisotope selected from the group consisting of $^{63}Ni$, $^{90}Sr$, $^{35}S$, $^{204}Tl$, and $^{3}H$, $^{148}Gd$, and $^{137}Cs$ or an alpha particle emitting radioisotope selected from the group consisting of $^{210}Po$, $^{244}Cm$, $^{238}Pu$, and $^{241}Am$, and wherein the ionizing radiation is from a radiation source that is encapsulated by a protective layer and at least a portion of the protective layer is in contact with the aqueous electrolyte solution, wherein the protective layer prevents chemical reactions between the radiation and the aqueous electrolyte solution, and wherein the radiation source is spaced from the anode a distance that is at least sufficient to prevent or limit lattice damage to the semiconductor component and no greater than about the distance the ionizing radiation can travel in the aqueous electrolyte solution; and wherein negatively charged solvated free radical ions are released from their surrounding water molecules and participate in redox reactions at the cathode/solution interface and positively charged solvated free radical ions are released from their surrounding water molecules and participate in redox reactions at the anode/solution interface thereby producing electrical current capable of performing work when the anode and cathode are electrically connected.

Conducting a Radiolytic Electrochemical Reaction

In another embodiment, the invention is directed to a method of conducting a radiolytic electrochemical reaction comprising operating any embodiment of the above-described radiolytic electrochemical system with the anode and cathode electrically connected.

Generating Current

In yet another embodiment, the invention is directed to a method of generating electrical current to perform work comprising operating any embodiment of the above-described radiolytic electrochemical system with the anode and cathode electrically connected.

Hydrogen Generator

In yet another embodiment, the invention is directed to a method for producing hydrogen gas comprising conducting a radiolytic electrochemical reaction comprising operating any embodiment of the above-described electrochemical system with the anode and cathode electrically connected, wherein the electrolyte solution does not comprise the above-described Redox compounds, and collecting hydrogen gas produced during the redox reactions.

Generation of Electron-Hole Pairs and Surface Plasmons

For ease of discussion, the Schottky component will be platinum, the semiconductor component will be nanoporous titania, and the ionizing radiation is beta radiation, but the described principles and operation apply for other appropriate materials selected in accordance with the foregoing.

When high-energy beta radiation passes through Pt and nanoporous $TiO_2$, electron-hole pairs are produced inside the nanoporous $TiO_2$. In particular, the holes generated in $TiO_2$ move toward the Pt/liquid interface and then react with redox couples of water molecules, while the electrons are transported through the nanoporous $TiO_2$ to the other electric contact due to the built-in potential at the Pt/electrolyte interface. In general, $TiO_2$ is resistant to corrosion, but the additional layer of Pt can further protect the $TiO_2$ layer under the harsh conditions of high pH values that are needed for water splitting. In addition, the porosity of the $TiO_2$ leads to myriad nanoholes in the Pt film, which create localised surface plasmons that act as harmonic oscillators in response to an oscillating external electric field.

Surface plasmons excited on the Pt surface can produce electron-hole pairs, with the excited electrons transiently occupying normally empty states in the Pt conduction band above the Fermi energy level. Most of the excited electrons are sufficiently energetic to enter the conduction band of $TiO_2$. The beta radiation in the electrochemical system produces free radicals in water through the loss of kinetic energy. In a meta-stable state, the free radicals are recombined into water molecules or trapped in water molecules. Thus, the free radicals produced by the radiation can be converted into electricity by a plasmon-assisted, wide band gap oxide semiconducting material using a water splitting technique at room temperature. For example, under beta radiation, surface plasmon obtained by the metallic nanoporous structures on $TiO_2$ enhanced the radiolytic conversion via the efficient energy transfer between plasmons and free radicals.

Generation and Behaviour of Free Radicals Under Beta Radiation

To understand the highly enhanced output power, it is necessary to understand the details of water radiolysis. High-energy electrons passing through an aqueous solution can ionise or excite water molecules, forming a number of transition species and stable products, as shown by the equation, $$H_2O \xrightarrow{\text{ionizing radiation}} e_{aq}^-, \cdot OH, H\cdot, HO_2\cdot, H_3O^+, OH^-, H_2O_2, \text{ and } H_2.$$

High levels of these products are formed by the absorption of 100 eV in the medium. The generated radicals are powerful redox reagents (i.e., $e_{aq}^-$ is a strong reducing agent, H. is an equally strong reducing and oxidising agent, and .OH is a powerful oxidising agent). In water at a high pH, $e_{aq}^-$ and .OH are produced in the largest quantities by the beta radiation whereas .OH tends to be predominantly produced in an acidic electrolyte. The standard potentials of $e_{aq}^-$ and .OH are $E^0 (H_2O/e_{aq}^-)=-2.9\ V_{NHE}$ and $E^0 (\cdot OH/H_2O)=+2.7\ V_{NHE}$, respectively. For completeness, one or more of the following reactions of ((R1)(R50)) set forth in Table A may be generated or occur during water radiolysis. T. Palfi et al., Rad. Phys. Chem. 79, 1154 (2010).

TABLE A (R1) $e_{aq}^- + e_{aq}^- + 2H_2O \rightarrow H_2 + 2OH^-$
(R2) $e_{aq}^- + H\cdot + H_2O \rightarrow H_2 + OH^-$
(R3) $e_{aq}^- + \cdot OH \rightarrow OH^-$
(R4) $e_{aq}^- + O^{-\cdot} + H_2O \rightarrow 2OH^-$
(R5) $e_{aq}^- + H_2O_2 \rightarrow \cdot OH + OH^-$
(R6) $e_{aq}^- + HO_2^- \rightarrow O^{-\cdot} + OH^-$
(R7) $e_{aq}^- + O_2 \rightarrow O_2^{-\cdot}$
(R8) $e_{aq}^- + O_2^{-\cdot} \rightarrow O_2^{2-}$
(R9) $e_{aq}^- + HO_2\cdot \rightarrow HO_2^-$
(R10) $e_{aq}^- + H_2O \rightarrow H\cdot + HO^-$
(R11) $e_{aq}^- + H_3O^+ \rightarrow H\cdot + H_2O$
(R12) $H\cdot + H\cdot \rightarrow H_2$
(R13) $H\cdot + \cdot OH \rightarrow H_2O$
(R14) $H\cdot + H_2O_2 \rightarrow \cdot OH + H_2O$
(R15) $H\cdot + HO_2^- \rightarrow \cdot OH + HO^-$
(R16) $H\cdot + O_2 \rightarrow HO_2\cdot$
(R17) $H\cdot + HO_2\cdot \rightarrow H_2O_2$
(R18) $H\cdot + O_2^{-\cdot} \rightarrow HO_2^-$
(R19) $H\cdot + OH^- \rightarrow e_{aq}^- + H_2O$
(R20) $\cdot OH + \cdot OH \rightarrow H_2O_2$
(R21) $\cdot OH + O^{-\cdot} \rightarrow HO_2^-$
(R22) $\cdot OH + H_2O_2 \rightarrow H_2O + HO_2\cdot$
(R23) $\cdot OH + HO_2^- \rightarrow H_2O + HO_2\cdot$
(R24) $\cdot OH + HO_2\cdot \rightarrow H_2O + O_2$
(R25) $\cdot OH + O_2^{-\cdot} \rightarrow OH^- + O_2$
(R26) $\cdot OH + H_2 \rightarrow H\cdot + H_2O$
(R27) $O^{-\cdot} + O^{-\cdot} \rightarrow O_2^{2-}$
(R28) $O^{-\cdot} + H_2O_2 \rightarrow H_2O + O_2^{-\cdot}$
(R29) $O^{-\cdot} + HO_2^- \rightarrow OH^- + O_2^{-\cdot}$
(R30) $O^{-\cdot} + O_2 \rightarrow O_3^{-\cdot}$
(R31) $O^{-\cdot} + O_2^{-\cdot} + H_2O \rightarrow 2OH^- + O_2$
(R32) $O^{-\cdot} + H_2 \rightarrow H\cdot + HO^-$
(R33) $H_2O_2 \rightarrow H_2O + O\cdot$
(R34) $O\cdot + O\cdot \rightarrow O_2$
(R35) $HO_2\cdot + HO_2\cdot \rightarrow H_2O_2 + O_2$
(R36) $HO_2\cdot + O_2^{-\cdot} \rightarrow HO_2^- + O_2$
(R37) $O_2^{-\cdot} + O_2^{-\cdot} \rightarrow O_2^{2-} + O_2$
(R38) $O_2^{2-} + H_2O \rightarrow HO_2^- + OH^-$
(R39) $OH^- + H_3O^+ \rightarrow 2H_2O$
(R40) $2H_2O \rightarrow OH^- + H_3O^+$
(R41) $\cdot OH + OH^- \rightarrow O^{-\cdot} + H_2O$
(R42) $O^{-\cdot} + H_2O \rightarrow \cdot OH + OH^-$
(R43) $H_2O_2 + OH^- \rightarrow HO_2^- + H_2O$
(R44) $HO_2^- + H_2O \rightarrow H_2O_2 + OH^-$
(R45) $O_2^{-\cdot} + H_3O^+ \rightarrow HO_2\cdot + H_2O$
(R46) $HO_2\cdot + H_2O \rightarrow O_2^{-\cdot} + H_3O^+$
(R47) $HO_3\cdot \rightarrow \cdot OH + O_2$
(R48) $O_3^{-\cdot} \rightarrow O^{-\cdot} + O_2$
(R49) $O_3^{-\cdot} + H_3O^+ \rightarrow HO_3\cdot + H_2O$
(R50) $HO_3\cdot + H_2O \rightarrow O_3^{-\cdot} + H_3O^+$ These two species ($e_{aq}^-$ and .OH) react with water molecules during water radiolysis and then remain in the aqueous solution. They can then no longer react with each other or with surrounding water molecules. Once these two species ($e_{aq}^-$ and .OH) are solvated in an aqueous solution, they can be surrounded by water molecules in a meta-stable state for a few μs. It is well known that water has very large dielectric constant and consists of polar molecules, which prevent the electrostatic attraction between positive and negative charges and maintain the separated state of charges surrounded by oppositely charged ends of water dipoles. During the long lifetime of solvated electrons, beta radiation will continuously increase the number of solvated electrons in the water until they finally move to the surface of water as they are emitted as thermal energy. The floated electrons form the negatively charged surface of water.

Theoretically, water has lower standard potential ($E^0$ ($H_2O/O_2$)=+0.82 $V_{NHE}$ and $E^0$ ($H_2O/H_2$)=−0.41 $V_{NHE}$) than free radicals, indicating that electrochemical energy of water is lower than that of free radicals. Additionally, the high electrochemical energy of solvated electrons ($e_{aq}^-$) can enable difficult chemical reactions to happen. Moreover, the presence of an external electric field or electromagnetic field can release the solvated electrons from their confined environment of surrounding molecules. This is because $e_{aq}^-$ in water has very small diffusion efficiency (4.8×10$^{-5}$ cm$^2$/s) and electron mobility (1.84×10$^{-3}$ cm$^2$N.$). Solvated electrons in water also need to get over the potential barrier of 0.2~0.5 eV set by the surrounding rigid water molecule network. Moreover, because water is located between both Pt electrodes (plasmonic layer and counter electrode), if same electrochemical reactions occur on both Pt surfaces, simply no current flow is expected.

EXAMPLES

Example

Pt-Nanoporous Titania Radiolytic Electrochemical Cell

A. Anode Preparation

Referring to FIG. 1, a nanoporous semiconductor was coated with a thin Pt film to produce a specially designed metal-semiconductor junction. Titania was selected for the semiconductor because it is a common, stable, large band gap oxide. A nanoporous structure was formed by anodising and subsequently thermally oxidising a thin Ti film. The large surface area of the porous structure provides more chemical reaction sites than a planar surface. In particular, a 2 μm thick titanium film was deposited on a glass substrate using an RF sputtering system, and an area of 1 cm$^2$ was patterned for an electrode. The substrate was cleaned with a standard solvent cleaning process, dried under a flow of N$_2$ gas, and immediately anodised in a 0.01 wt % HF aqueous solution under an applied voltage of 40 V for 5 min. Immediately after cleaning and drying the anodised Ti films, the substrate was annealed in a convection oven at 450° C. for 2 hours. To form a stable Schottky contact at the semiconductor/metal interface, a thin (50 nm thick) Pt film was uniformly deposited using a radio frequency (RF) sputtering system. A copper wire was connected to the electrode of each sample and covered with epoxy to electrically isolate the electrolyte.

Figure 2:
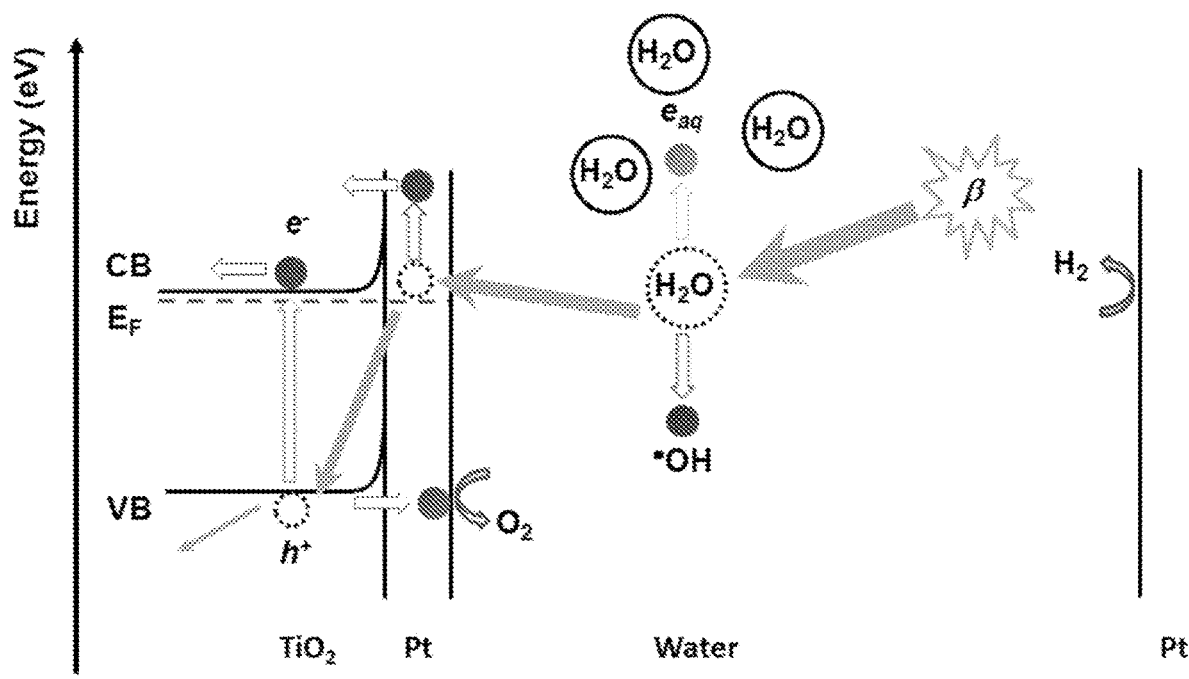
FIG. 2 is an energy level diagram of a surface-plasmon-assisted radiolytic water splitter (CB, conduction band; VB, valence band; $E_F$, Fermi energy; $e_{aq}^-$, aqueous electron; .OH, hydroxyl free radical; β, beta radiation).

As shown in the band diagram of the junctions in FIG. 2, a Schottky barrier of 0.45 eV is formed because the Fermi energy ($E_F$) of TiO$_2$, an n-type semiconducting oxide, is 5.2 eV while that of Pt is 5.65 eV with respect to the vacuum level. The Schottky barrier height between Pt and $TiO_2$, was confirmed using XPS analysis and was measured at 0.6 eV between Pt and $Pt/TiO_2$ layers.

B. Structural and Optical Properties

Scanning electron microscopy (SEM) was performed using an FEI Quanta 600 FEG extended vacuum scanning electron microscope with an accelerating voltage of 10 kV and an energy dispersive spectrometer (Noran System Six). X-ray diffraction (XRD) analysis was conducted using a Rigaku Miniflex 600 X-ray diffractometer with Cu Kα radiation. The reflection spectrum was measured using a Perkin-Elmer lambda 25 UV-VIS spectrometer and variable-angle reflectance accessory.

Figure 3:
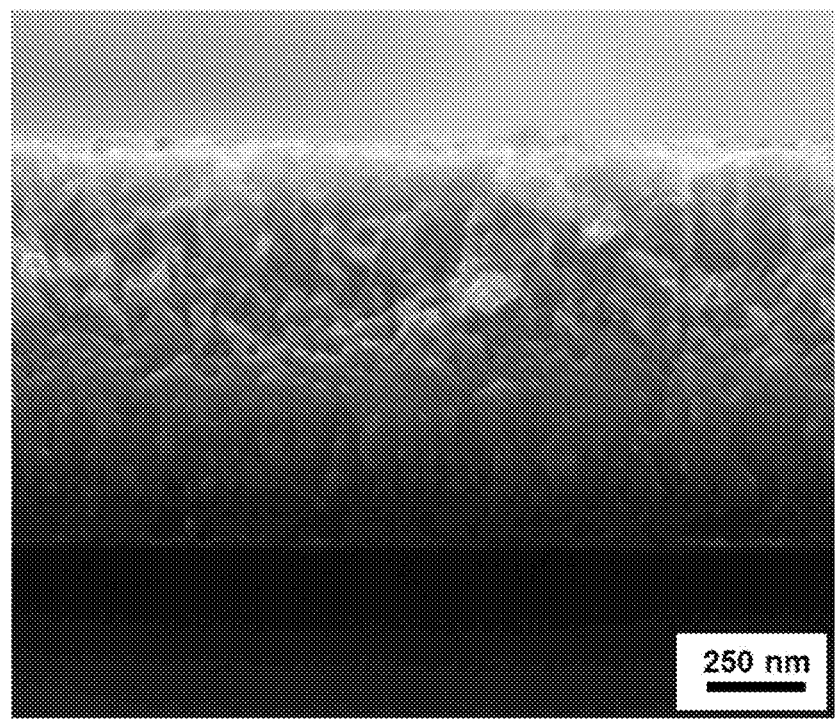
FIG. 3 is a cross-sectional SEM image of nanoporous $TiO_2$ on glass.
Figure 4:
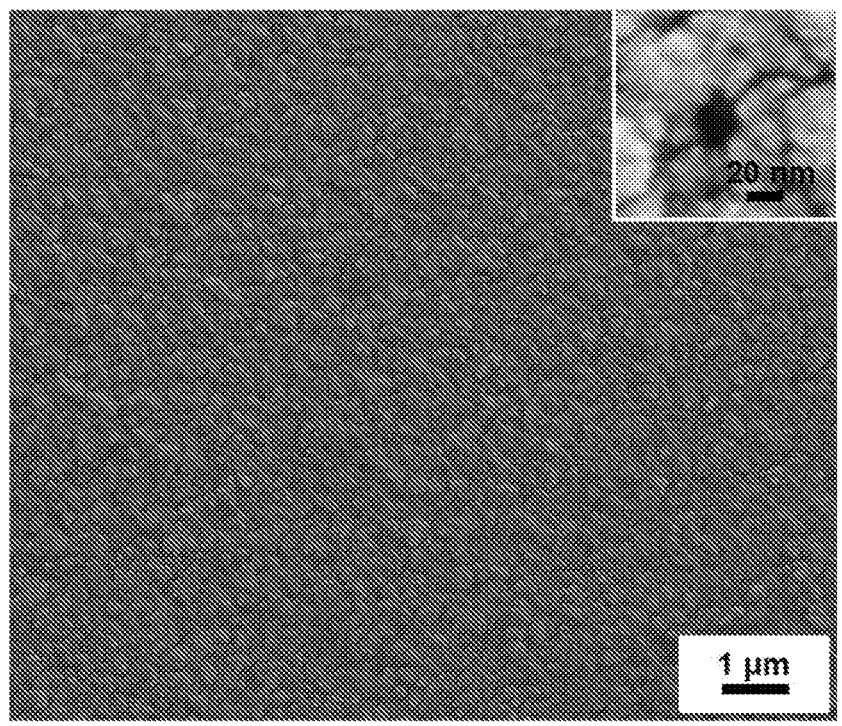
FIG. 4 is an SEM image of Pt-coated nanoporous $TiO_2$ viewed from the top and the inset is a SEM image of a nanohole.
Figure 5:
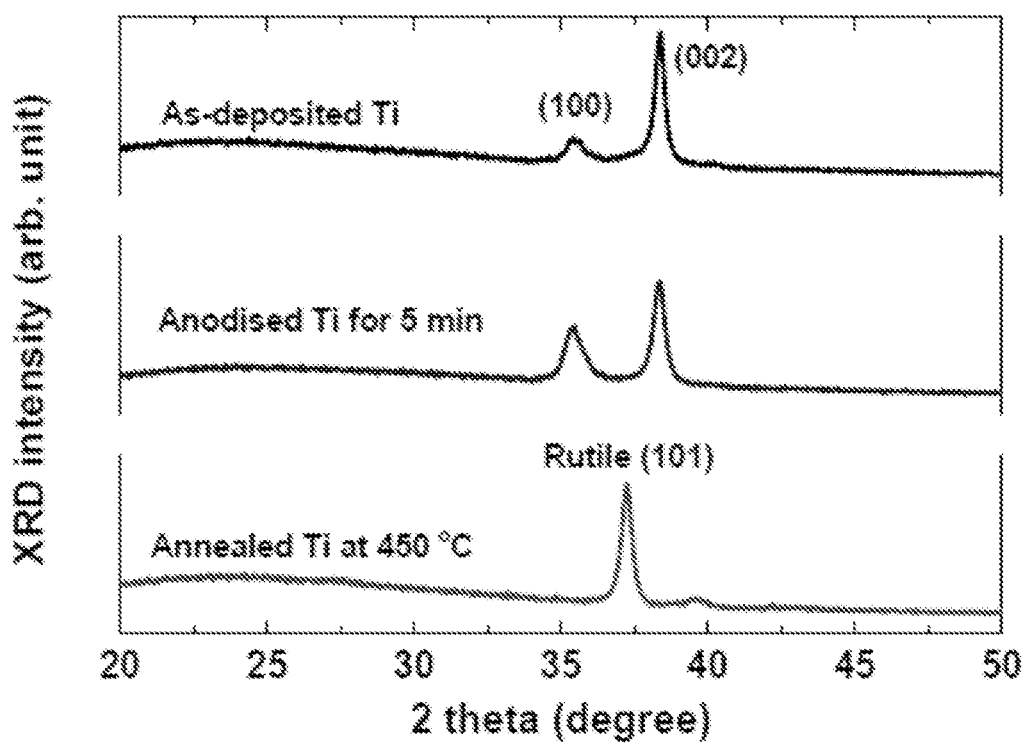
FIG. 5 is XRD data of as-deposited Ti, anodised Ti, and rutile $TiO_2$).

Scanning electron microscopy (SEM) images and X-ray diffraction (XRD) data for the nanoporous $TiO_2$ are shown in FIG. 3, FIG. 4, and FIG. 5. The cross-sectional SEM image shows the existence of nanopores 100 nm in diameter and 1 μm deep with a spacing of 100 nm (FIG. 3). FIG. 4 shows a top-viewed SEM image of a 50-nm-thick Pt film coated surface of nonporous $TiO_2$. After Pt deposition on nanoporous $TiO_2$ film, size of the Pt nanohole turns out to be approximately 10~20 nm (FIG. 4, inset). The density of holes is $3~5 \times 10^9$ cm$^{-2}$. As shown by the XRD data in FIG. 5, after the as-deposited Ti was anodised for 5 min, the intensity of the Ti (002) peak decreased compared to that of the Ti (001) peak, indicating the presence of vertically arranged uniform nanopores along the <002> direction of the Ti. After the anodised Ti was thermally oxidised at 450° C. for 2 hours, the (001) and (002) peaks of Ti disappeared, and a new peak (37.24°) corresponding to the rutile crystalline structure appeared, indicating that $TiO_2$ has a band gap of 3.2 eV.

C. Electrical Properties

Figure 6:
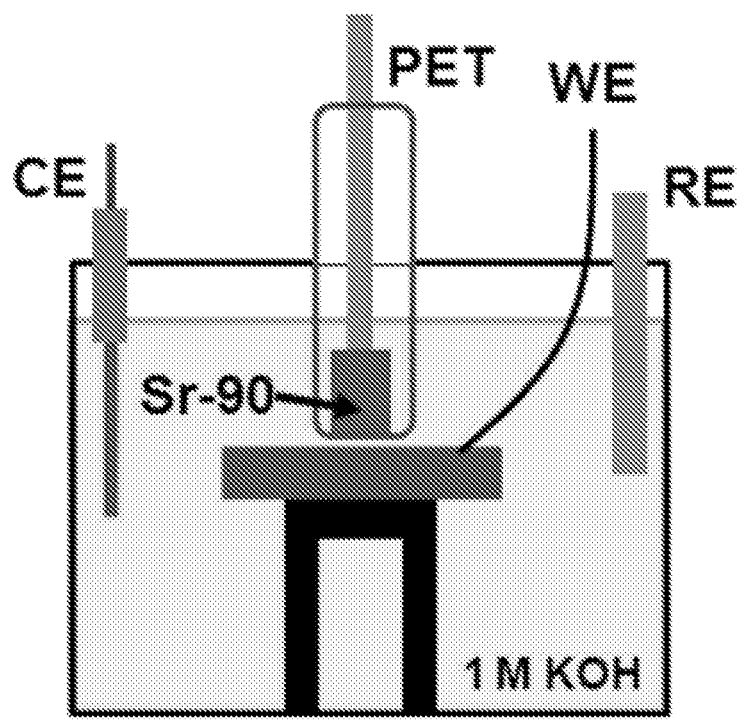
FIG. 6 is a schematic view of the testing setup for Pt/nanoporous $TiO_2$ under irradiation.
Figure 7:
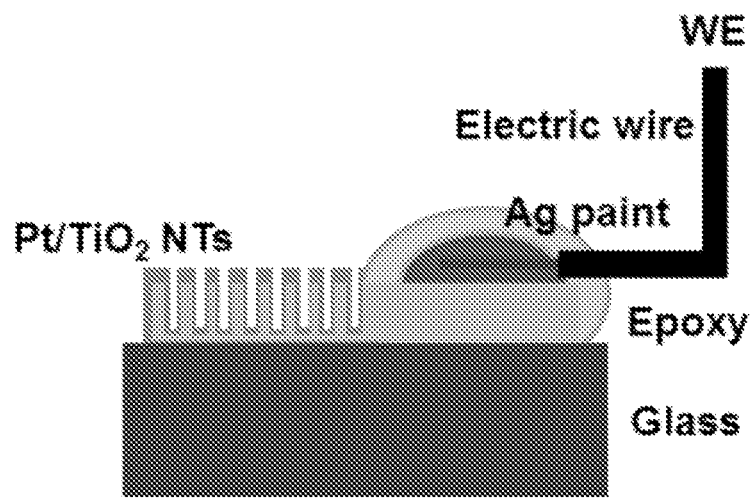
FIG. 7 is a schematic diagram and photograph of the Pt/nanoporous $TiO_2$ electrode.

Illustrations of the test setup and of the Pt/nanoporous $TiO_2$ cathode are shown in FIG. 6 and FIG. 7. During the experiment, gas bubbles on the PET plastic shielding film of the $^{90}Sr/^{90}Y$ source clearly demonstrated the occurrence of water splitting. A potentiostat was used to evaluate the radiolytic performance of the Pt/nanoporous $TiO_2$ electrode in a 1 M KOH aqueous solution. The potentiostat (DY2322, Digi-Ivy) was connected to the three (reference, counter, and working) electrodes for data collection. Consecutive J-V measurements were collected from 1.0 V to −1.5 V with respect to Ag/AgCl reference electrodes in a three-electrode system at a fixed scan rate of 0.05 V/s. Other possible reference electrodes include standard hydrogen electrode, saturated calomel electrode, copper-copper(II) sulfate. The electrolyte solution was 1 M KOH (Sigma Aldrich, 99%). A radioisotope source ($^{90}Sr/^{90}Y$, 15 mCi) sealed in stainless steel was chosen for our experiment. The distance between the electrode and the radiation source was selected to maintain a constant activity of 15 mCi at the surface of the device, which was approximately 1 mm. All experiments were performed in a dark room to eliminate the effects of a photocurrent. In addition, to ensure that the reaction only involved diffused radicals, the solution was not agitated.

Figure 8:
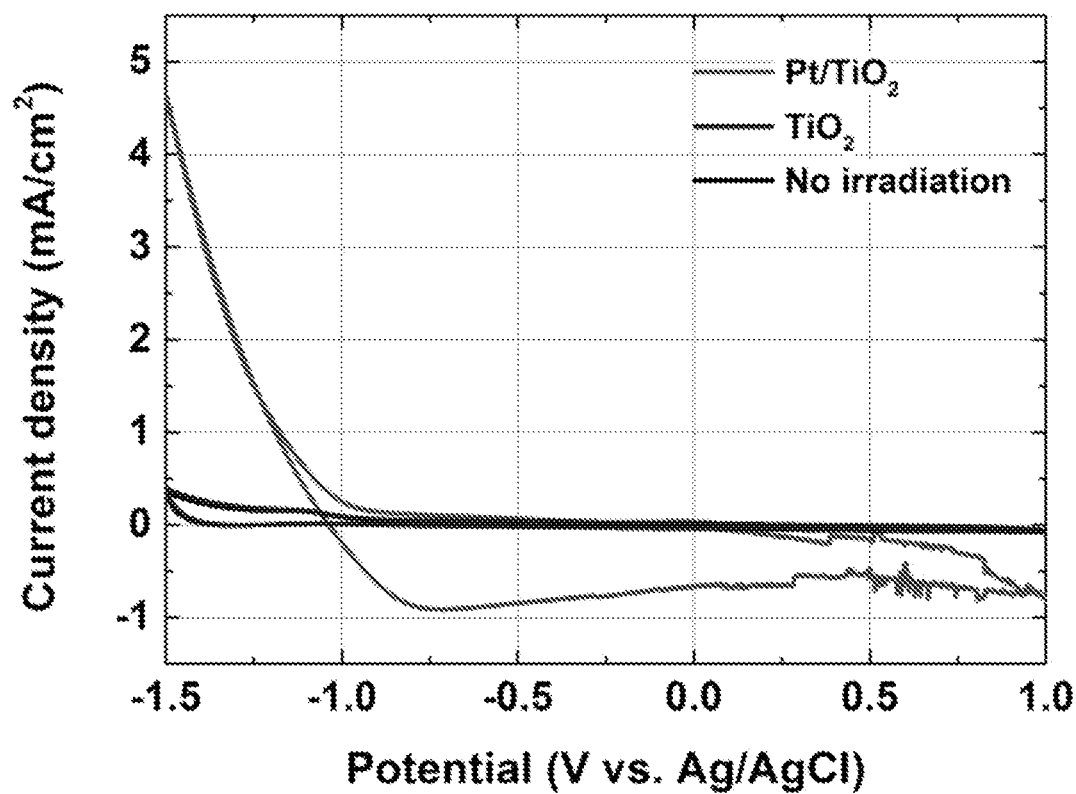
FIG. 8 is a chart of J-V characteristics of irradiated devices with a Pt/nanoporous $TiO_2$ radiolytic electrode (plot with substantial change in current density at a function of potential) and a nanoporous $TiO_2$ radiolytic electrode (the lowest plot with a noticeable change in current density around −1.5 V potential), and of unirradiated device with Pt/nanoporous $TiO_2$ in a dark room (the middle, substantially horizontal plot).

The current density-voltage characteristics were measured at open circuit voltage and the current density at 0 V, −0.1 V, −0.4 V, −0.7 V, and −0.9 V for 1200 seconds each under continuous irradiation. FIG. 8 shows the current density—voltage (J-V) characteristics for the Pt/nanoporous $TiO_2$ radiolytic electrode (red line) under irradiation. For comparison, the radio current of a nanoporous $TiO_2$ electrode (blue line) under irradiation and the dark current of Pt/nanoporous $TiO_2$ (black line) under no irradiation. While the radio current of nanoporous $TiO_2$ is slightly larger than the dark current of Pt/nanoporous $TiO_2$, the radio current of Pt/nanoporous $TiO_2$ is significantly larger than both the radio current of nanoporous $TiO_2$ and the dark current of Pt/nanoporous $TiO_2$. The radio current density of Pt/nanoporous $TiO_2$ is saturated at −175.4 μA/cm$^2$ for 0 V, while the dark current density of Pt/nanoporous $TiO_2$ and the radio current density of $TiO_2$ are approximately −1.051 μA/cm$^2$ and −0.0719 μA/cm$^2$, respectively. At −0.9 V, the radio current density of Pt/nanoporous $TiO_2$, the dark-current density of Pt/nanoporous $TiO_2$, and the radio current density of $TiO_2$ are −83.336 μA/cm$^2$, 70.31 μA/cm$^2$, and 2.85 μA/cm$^2$, respectively. These measurements are summarized in Table B below to compare the performance of the irradiated devices with Pt/nanoporous $TiO_2$ and nanoporous $TiO_2$.

TABLE B

| Electrode | $V_{oc}$ (V) | $J_{sc}$ (A/cm$^2$) | $J_{-0.1\,V}$ (A/cm$^2$) | $J_{-0.4\,V}$ (A/cm$^2$) | $J_{-0.7\,V}$ (A/cm$^2$) | $J_{-0.9\,V}$ (A/cm$^2$) | Condition |
|---|---|---|---|---|---|---|---|
| Pt/TiO$_2$ | −1.010 | −1.754E−4 | −1.159E−4 | −1.034E−4 | −1.030E−4 | −8.336E−5 | Irradiation |
| TiO$_2$ | −0.128 | −7.190E−8 | 2.742E−8 | 4.269E−7 | 8.537E−7 | 2.850E−6 | Irradiation |

Figure 9:
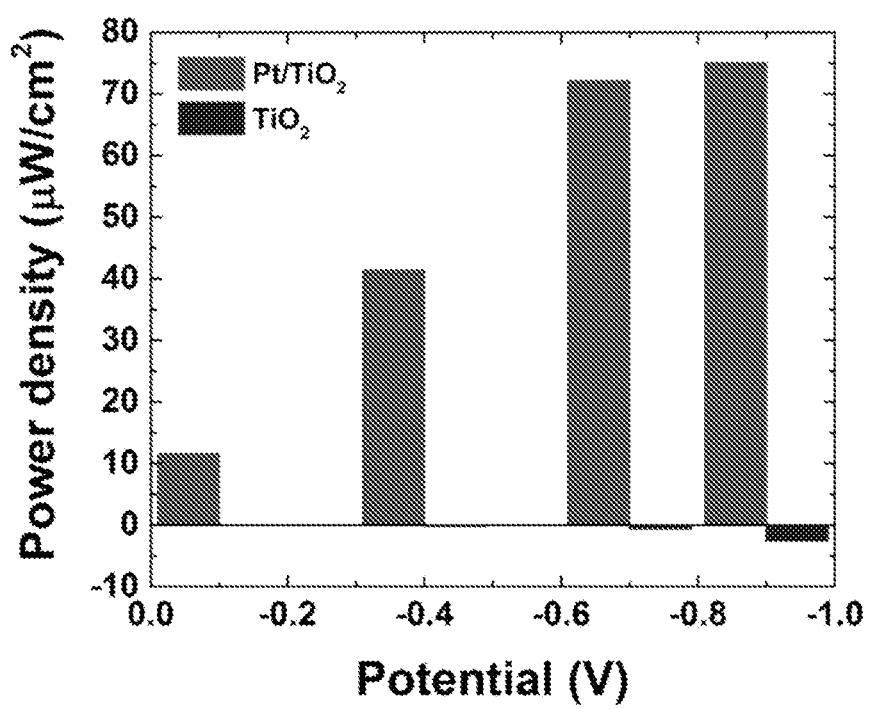
FIG. 9 is chart of power densities of irradiated devices with Pt/nanoporous $TiO_2$ (the bars showing power densities significantly greater than zero) and nanoporous $TiO_2$ (the bars showing power densities that are slightly below zero). The area of the electrode is 1 $cm^2$.

FIG. 9 manifests the clear difference in output power from devices with and without the plasmonic Pt layer. The output power densities (11.59 μW/cm$^2$ at −0.1 V and 75.02 μW/cm$^2$ at −0.9 V) of the Pt/nanoporous $TiO_2$ electrode are higher than the power densities (−0.0027 μW/cm$^2$ at −0.1 V and −2.565 μW/cm$^2$ at −0.9 V) of nanoporous $TiO_2$. For a radioactive material activity of 15 mCi (±10%), the total number of beta particles per unit time is estimated to be $5.55 \times 10^8$ s$^{-1}$, and the total input power density of the beta particles is 139.238 μW/cm$^2$, when the average kinetic energy of $^{90}Sr/^{90}Y$ is 490.96 keV. Thus, the efficiency turns out to be 74.7%. One possible reason for the high output power density under irradiation is that a certain level of the EHP ionisation energy of beta particles can easily excite electrons because the EHP ionisation energy is much higher than the band gap of each material while a large portion of the spectrum of solar light is below the $TiO_2$ band gap, indicating that the $TiO_2$ layer does not absorb sunlight well. Therefore, beta particles are a reliable energy source for electricity generation via water splitting.

D. Energy Absorption of Electron Beam Using Numerical Simulation

Figure 10:
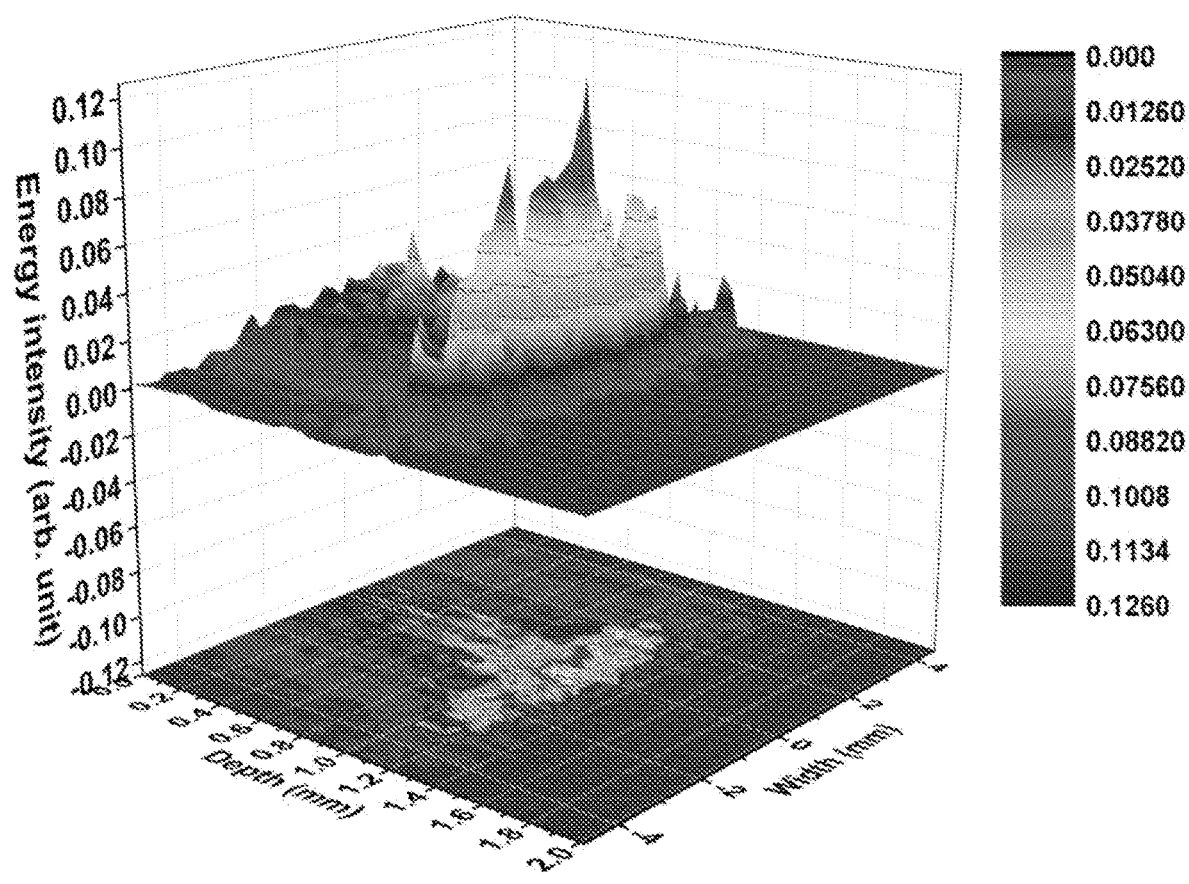
FIG. 10 is an absorbed energy distribution of an electron beam in the PET (20 μm)/water (1 mm)/Pt (50 nm)/$TiO_2$ (1 μm)/glass (1 mm) structure as part of an MC simulation of the electron beam in a radiochemical cell.
Figure 11:
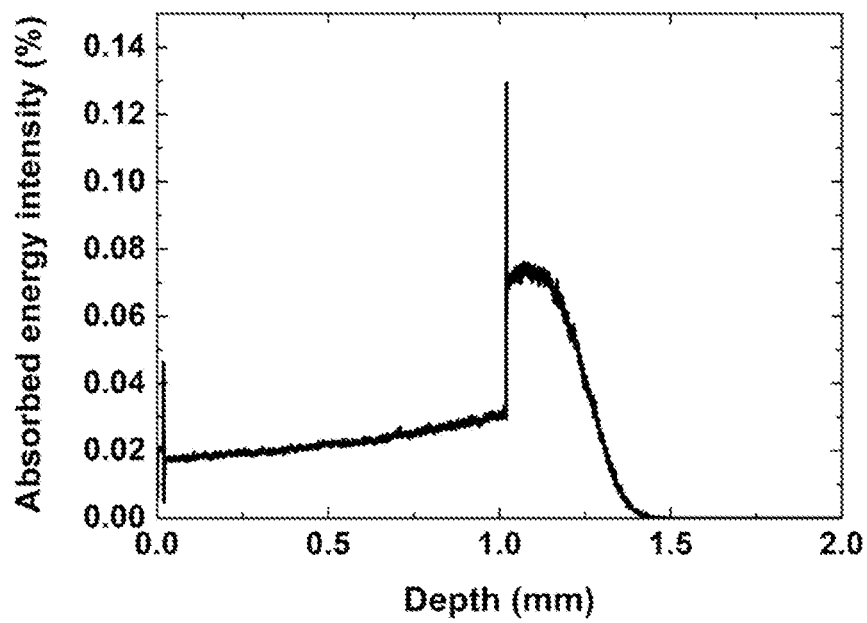
FIG. 11 is a cross-sectional view of the absorbed energy intensity at the centre of the electron irradiation.

To study the mechanism of the enhanced power conversion of the radiation, the energy absorbed in an aqueous solution was calculated using Monte Carlo (MC) simulations. The number of electrons utilised in this simulation was 10,000, and the kinetic energy of the electron beam was 546 keV. A beta particle is an electron (e$^-$) or a positron (e$^+$) that is generated when the neutron to proton ratio in the nucleus is too large, making the nucleus unstable. In this simulation, the presence of secondary electrons generated by primary electrons was ignored, and the electron beam was defined by a Gaussian distribution. The energy absorbed by the $TiO_2$ film was calculated to be approximately 0.25% of the total energy of the electron beam (FIG. 10 and FIG. 11). In the middle of the water, the absorbed energy was approximately 55.57%. Note that the incident beta radiation can be scattered and reflected by our nanoporous structure, indicating that more energy will be absorbed by Pt/nanoporous $TiO_2$ and water than expected in this simulation.

Beta radiation can create vacancies in a solid by primary knock-on atoms (PKA). For rutile $TiO_2$, the threshold displacement energy is about 47 eV. A required incident kinetic energy level of beta radiation for the vacancy production can be estimated from the displacement energy equation, $T_m=2(E+2mc^2)E/Mc^2$, where E is kinetic energy of beta radiation and c is speed of light, and m and M are masses of electron and target atom, respectively. Under beta radiation, the threshold displacement energy of 47 eV is equivalent to the incident kinetic energy of 271 keV for oxygen and 633.5 keV for titanium. It was also found from the MC simulations that the water can absorb beta radiation of 356 keV. Because the PKA damage in $TiO_2$ occurs from the kinetic energy over 271 keV, the performance degradation of our radiolytic cell might begin with the kinetic energy over 627 keV. Although beta radiation from $^{90}Sr/^{90}Y$ includes higher energy beta particles than 627 keV, the radiolytic cell didn't show any performance degradation for about 6 hours. Moreover, water can absorb 72.02% of the total kinetic energy in emission spectrum of $^{90}Sr/^{90}Y$.

To determine the total kinetic energy passing through Pt/nanoporous $TiO_2$, the directional loss of radiation source was considered. The directional loss is the geometrical effect between source and device as a function of distance and source shape. When two parallel discs with each radius of $R_s$ and $R_d$ are placed at a distance L, solid angle ($\Omega_s$) is calculated by $$\Omega_s = \frac{R_d}{R_s}\frac{1}{2m_s}\left[1-\sqrt{1-m_s^2}\right] \text{ and } m_s = \frac{2R_dR_s}{L^2+R_d^2+R_s^2}.$$

Therefore, the directional loss ($\eta$) can be estimated by $\eta=(1-\Omega)\cdot100\%$. The directional loss of the present radiolytic cell was estimated to be approximately 54.88% and the amount of higher kinetic energy than 627 keV was only 12.62% of the total kinetic energy of beta radiation, indicating that performance degradation of the radiolytic cell may not be serious.

In this situation, incident high-energy beta particles can excite electrons in the semiconductor via their energy loss, which is defined as the electron-hole pair (EHP) ionisation energy given by $W_\pm \approx 2.8E_g + E_{ph}$, where $E_g$ and $E_{ph}$ are the band gap and phonon energies ($0.5 \le E_{ph} \le 1$ eV), respectively. For $TiO_2$, $W_\pm$ is approximately 9.46 eV. Because the high EHP ionisation energy is sufficient for tunneling through a low Schottky barrier at the $TiO_2$/liquid interface, the radio current of nanoporous $TiO_2$ is lower than the radio current of Pt/nanoporous $TiO_2$, as shown in FIG. 8. When beta particles pass through the $TiO_2$ layer (1 μm), the number of generated EHPs is estimated to be approximately 144 per single beta particle, that is, the deposition power is estimated to be 0.12 μW/$cm^2$. Although most of the EHPs generated within the depletion region are separated due to the built-in potential of the thin $TiO_2$ layer, the measured output power density was much less than the expected value of 75.02 μW/$cm^2$ at −0.9 V. This result indicates that the EHPs generated in $TiO_2$ via beta radiation are not sufficient to produce the total output power density measured in the experiment.

E. Finite-Difference Time-Domain (FDTD) Simulation

Figure 14:
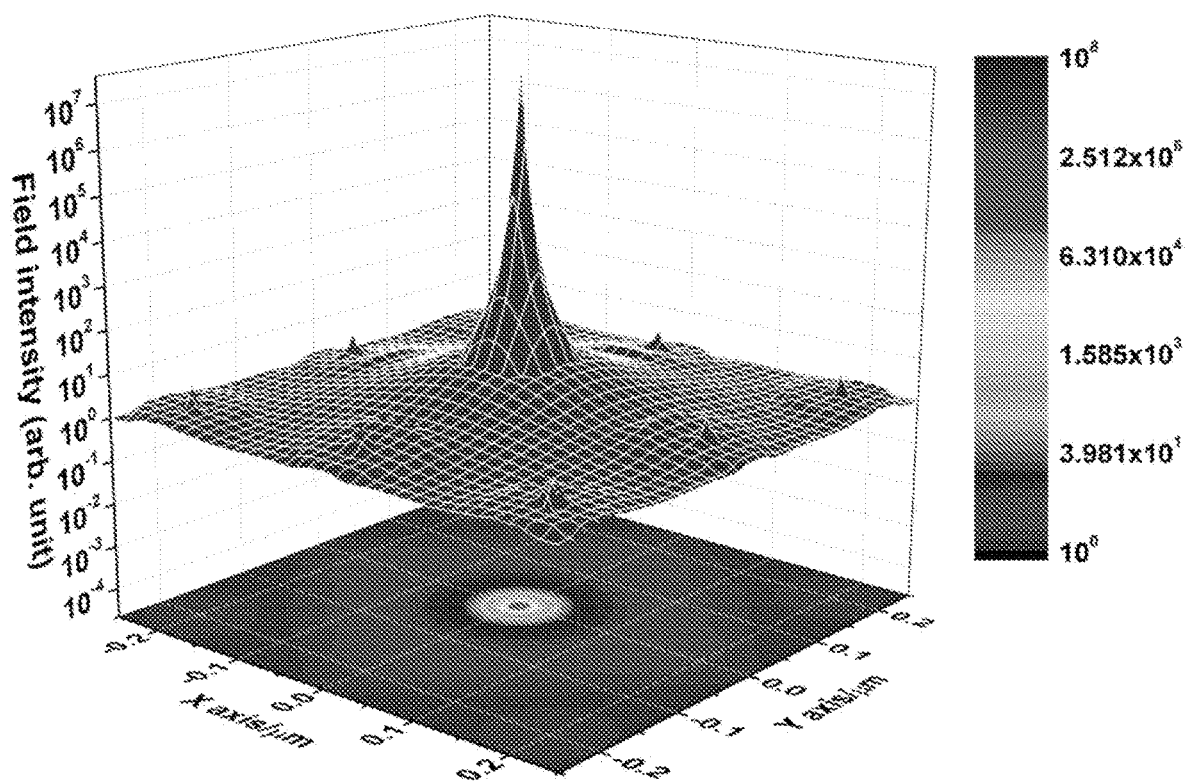
FIG. 14 (a) is a top view and (b) is a cross-sectional view of the near-field intensity distributions on Pt/nanoporous $TiO_2$ at the top level of Pt nanohole at position 1 of FIG. 12 for 290 nm. The field intensity is shown on a log scale, $[E]^2/[E_0]^2$, where E and $E_0$ are the generated and minimum electric field intensities, respectively.
Figure 14:
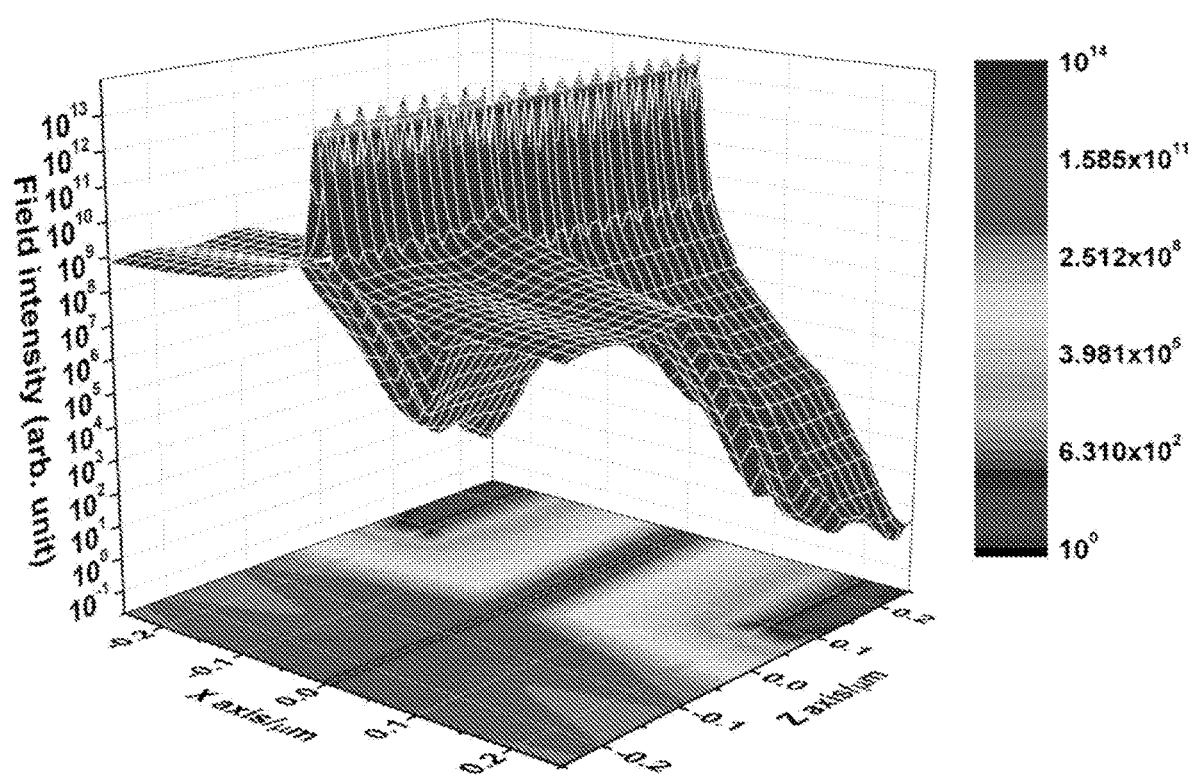
Figure 15:
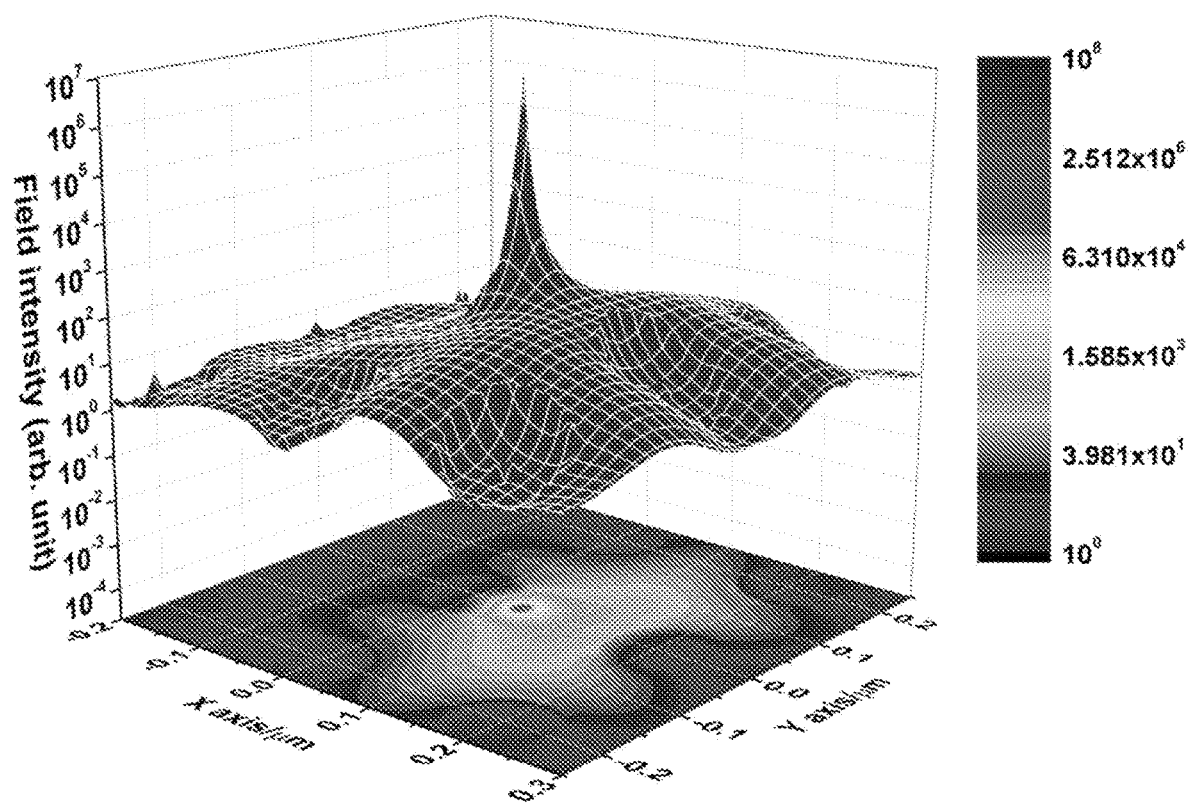
FIG. 15 (a) is a top view and (b) is a cross-sectional view of the near-field intensity distributions on Pt/nanoporous $TiO_2$ at the top level of Pt nanohole at position 2 of FIG. 12 for 287 nm. The field intensity is shown on a log scale, $[E]^2/[E_0]^2$, where E and $E_0$ are the generated and minimum electric field intensities, respectively.
Figure 15:
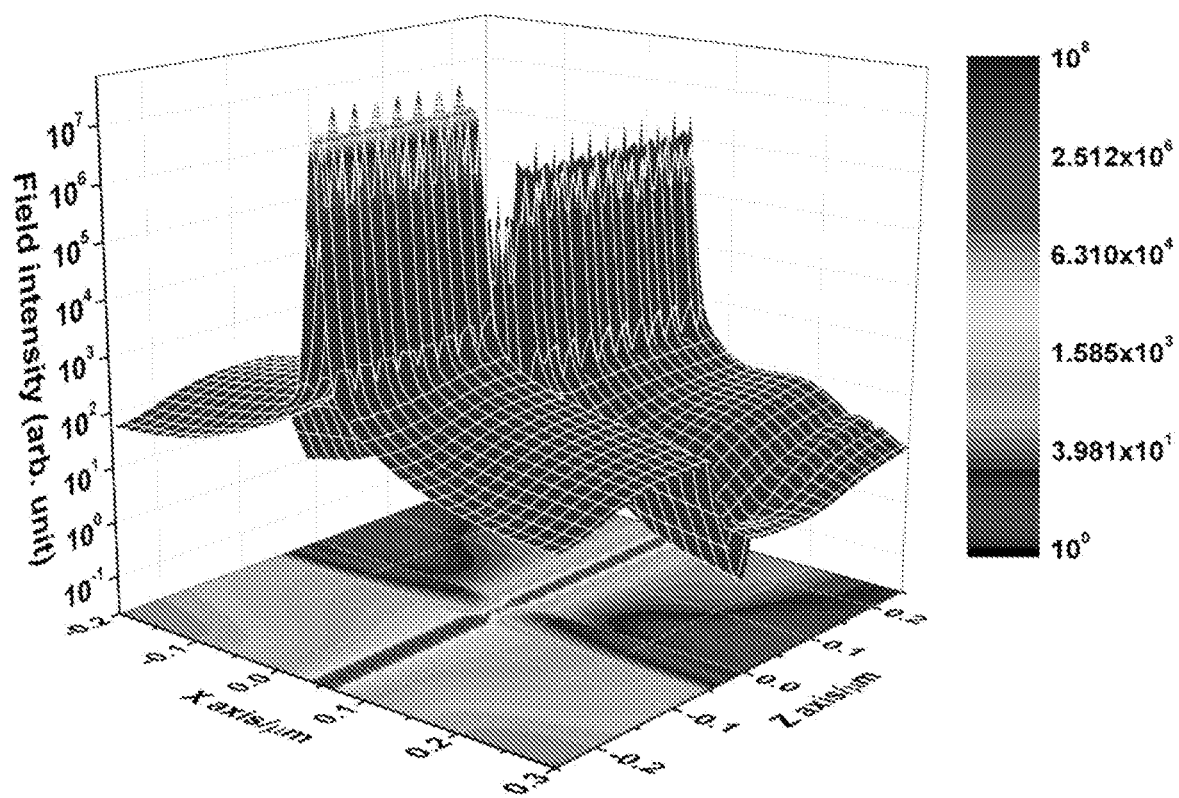
Figure 16:
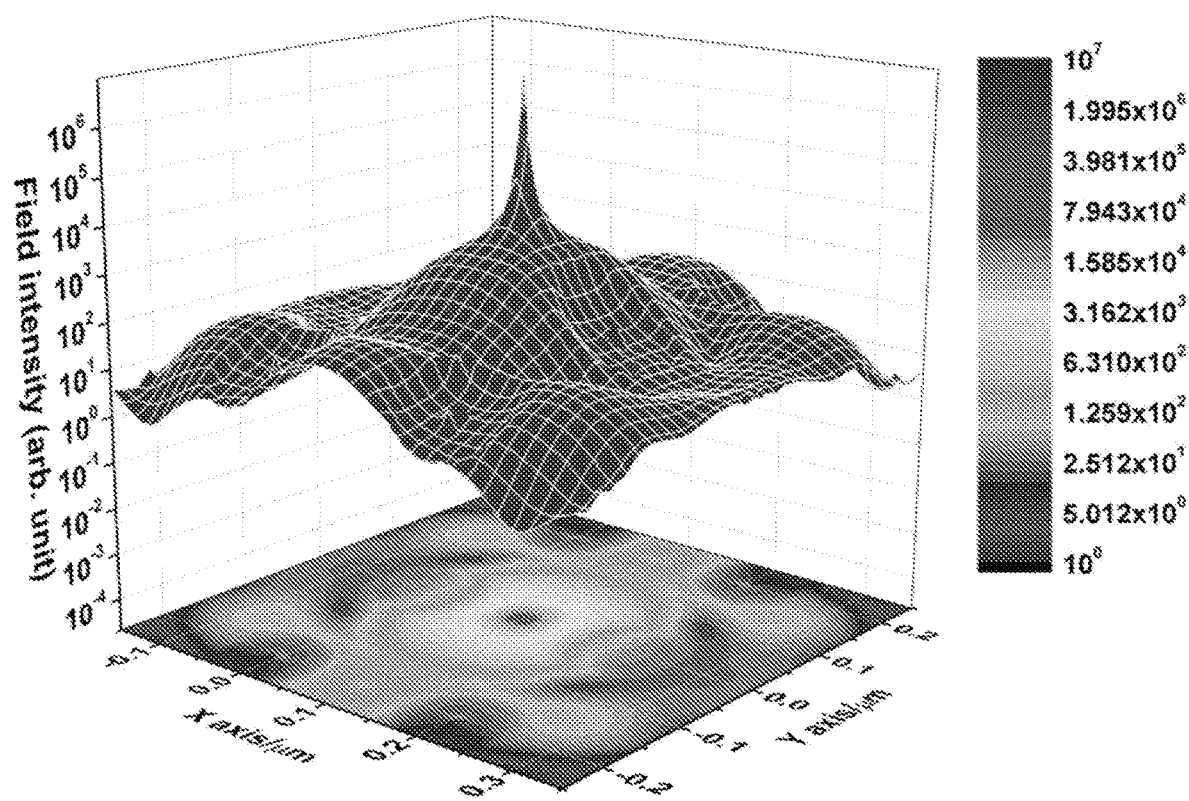
FIG. 16 (a) is a top view and (b) is a cross-sectional view of the near-field intensity distributions on Pt/nanoporous $TiO_2$ at the top level of Pt nanohole at position 3 of FIG. 12 for 377 nm. The field intensity is shown on a log scale, $[E]^2/[E_0]^2$, where E and $E_0$ are the generated and minimum electric field intensities, respectively.
Figure 16:
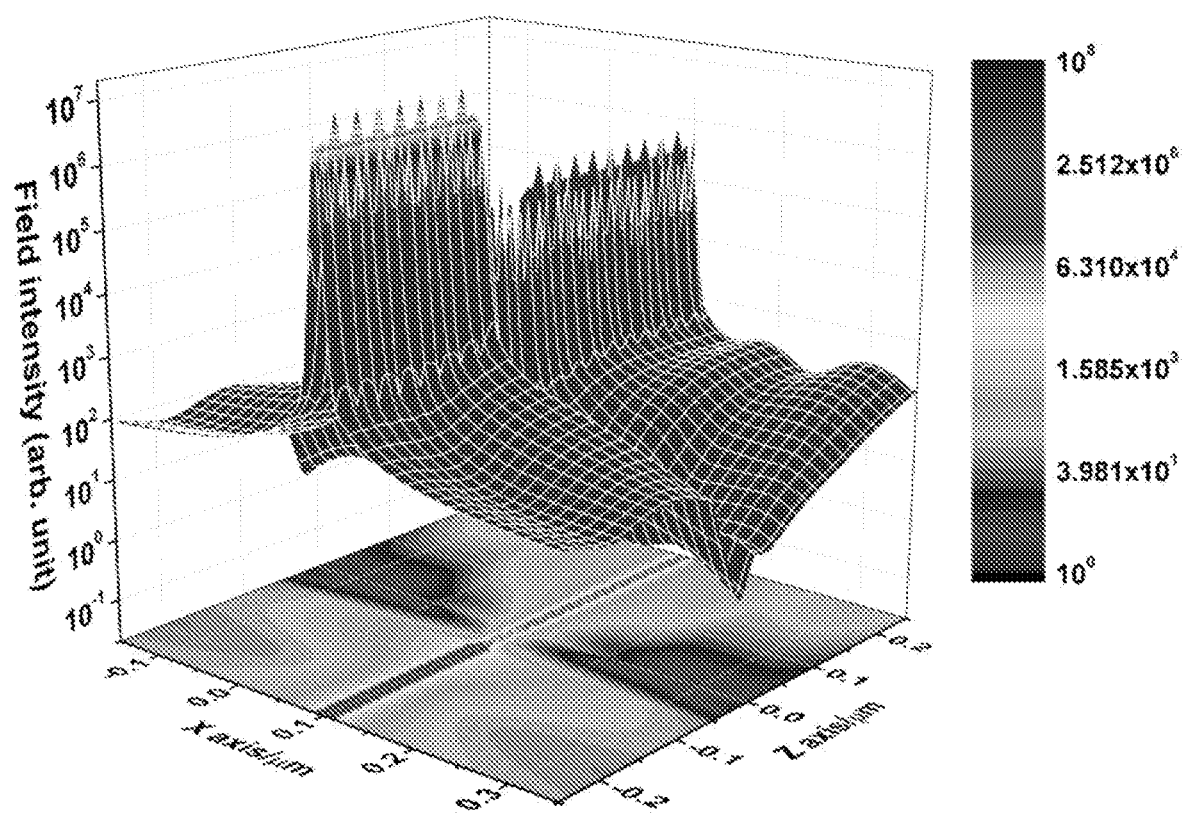

One available external electric field in our device is the localised electric fields from the surface plasmons of the Pt nanoholes. To generate surface plasmons on the Pt/nanoporous $TiO_2$ radiolytic electrode, 3D-FDTD (finite-difference time-domain) numerical simulations were conducted using a commercially available FDTD code for simulating electron irradiation (e.g., available at www.lumerical.com). The FDTD simulation was based on Pt (50 nm)/nanoporous $TiO_2$ (1 μm) composed of a periodic array of nanoholes with a diameter of 10 nm and a depth of 505 nm on a glass substrate. The electron beam was modeled as a series of closely spaced dipoles with a temporal phase delay defined by the velocity of the electron beam. In the absence of a structure, an electron beam moving at a constant velocity does not generate any radiation. The material properties used in the calculation are based on the dispersion data set forth in Devore, J. R. Refractive indices of rutile and sphalerite, *J. Opt. Soc. Am.* 41, 416-419 (1951) and Palik, E. D., Handbook of optical constants of solids, Academic Press (1997). The detailed electron irradiation profiles at the different positions at the bottom level of the nanoholes in FIG. 14 through FIG. 16 show the strong influence of the Pt/nanoporous $TiO_2$ structures on the scattering direction.

Figure 12:
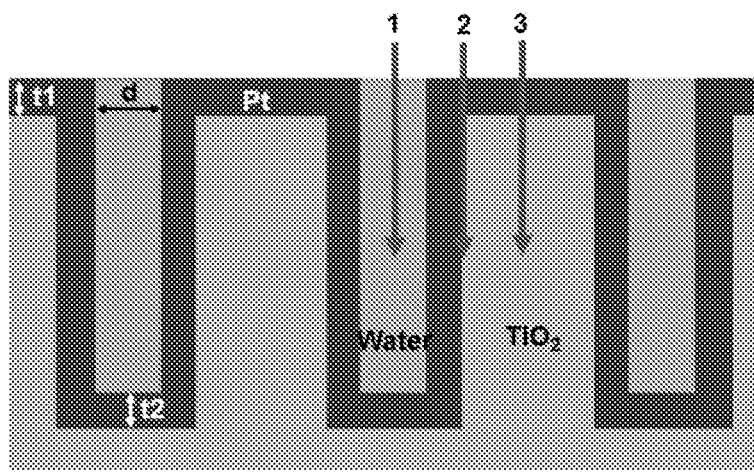
FIG. 12 contains a cross-sectional view schematic and top view schematic for different e-beam (546 keV) positions marked as 1-3 and d is 10 nm, s is 200 nm, t1 is 50 nm, and t2 is 45 nm.
Figure 12:
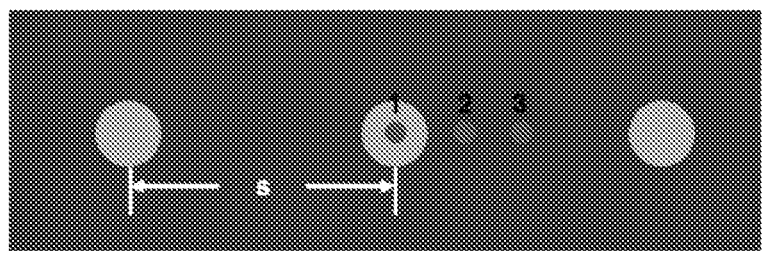

In FDTD, the macroscopic Maxwell equations are solved in discretised space and time to follow the response of a material to an applied electric field. For a numerical investigation of the beta radiation-excited photon emission in Pt/nanoporous $TiO_2$, the electron beam can be modelled as a line current density source represented by $\vec{J}(t,\vec{r})=-ev\hat{u}_z\delta(x-vt)\delta(x-x_0)\delta(y-y_0)$, where e is the electronic charge, v is the electron velocity, ($x_0$, $y_0$) represents the position of the focused electron beam, z is the direction of the electron velocity, and $\hat{u}_z$ is the unit vector along the z direction. In the simulation, the current density was modelled as a series of dipoles with a temporal phase delay (z/v) related to the electron velocity, v (in this simulation, v=0.875c, corresponding to the beta particle's kinetic energy of 546 keV used in the experiment, and c is the velocity of light in free space). The simulations were conducted at three different points: in the middle of a pore, at the side wall of a pore, and between two pores (denoted as 1, 2, and 3 in FIG. 12).

Figure 13:
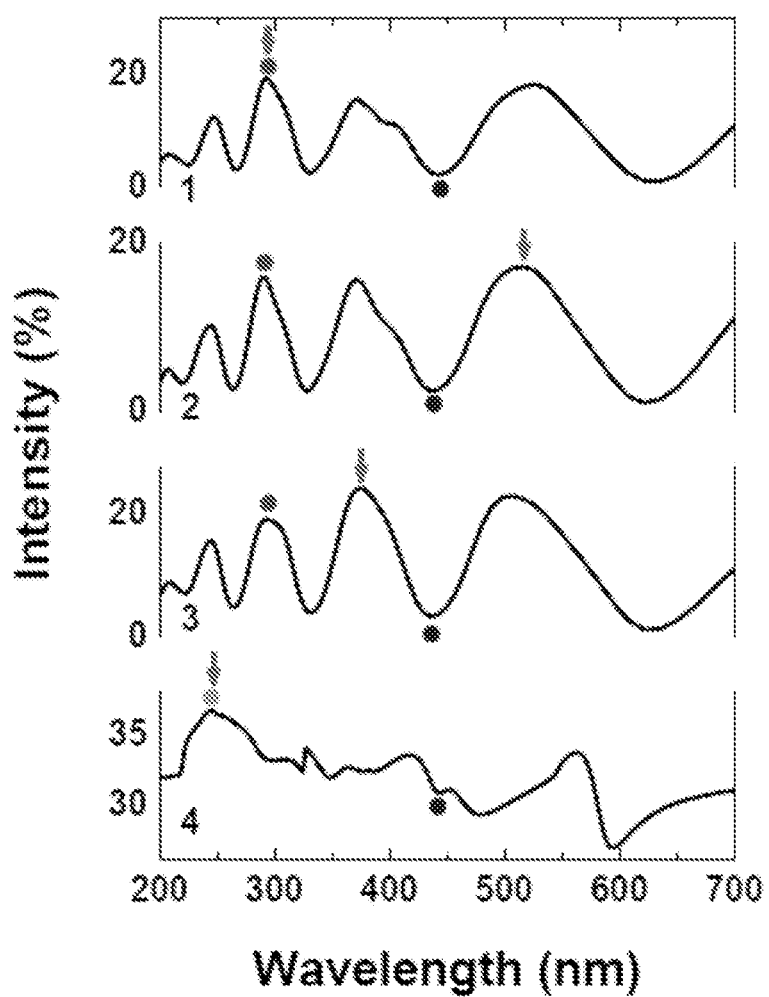
FIG. 13 is an emission spectra of the Pt/nanoporous $TiO_2$ surfaces at positions 1-3 of FIG. 12, which correspond to plots 1-3, respectively. The arrows indicate the highest peak positions. Plot 4 shows the reflection of Pt/nanoporous $TiO_2$ using a UV-VIS spectrometer.

To simulate the near-field electric intensities and emission spectra at the different positions, the induced electric field distributions were calculated by $[E]^2/[E_0]^2$, where E and $E_0$ are the generated and minimum electric field intensities, respectively, emitted normal and parallel to the Pt surface in the wavelength range of 200 to 700 nm. The near-field intensity distributions on Pt/nanoporous $TiO_2$ at the different positions under focused electron irradiation were investigated using FDTD simulations. As shown in FIG. 13, the highest emitted spectral peaks were calculated to occur at wavelengths of 293 nm, 517 nm, and 376 nm when the electron irradiation is focused near positions 1, 2, and 3 in FIG. 12, respectively. These results indicate that the strongest surface plasmon energy (4.23 eV) and field intensity are generated when the nanohole is irradiated. The diffraction pattern is also shown for position 3 on periodic Pt/nanoporous $TiO_2$. To confirm the surface plasmons, the reflectance of Pt/nanoporous $TiO_2$ structures was measured using an UV-VIS spectrometer. As shown in FIG. 13, plots 1-3 are the calculated emission spectra of Pt/nanoporous $TiO_2$ in water, while plot 4 is the measured reflectance of Pt/nanoporous $TiO_2$ in air. The reflection peaks (the dots) of plot 4 were found at the similar positions with respect to the simulated emission peaks shown at plots 1-3. The strongest reflection peak (the arrows) of Pt/nanoporous $TiO_2$ is shown at 245 nm (5.06 eV) by plasmon resonant coupling in air/Pt nanoholes.

To understand the surface plasmon phenomena between two materials, Maxwell's equation was solved for the electromagnetic wave at the interface between two materials, which has relative dielectric functions $\epsilon_1$ ($=\epsilon'_1+i\epsilon''_1=(n_1^2-\kappa_1^2)+i(2n_1\kappa_1)$) and $\epsilon_2$ ($n_2^2+i\epsilon''_2=(n_2^2-\kappa_2^2)+i(2n_2\kappa_2)$) with the appropriated continuity relationship. Real and imaginary parts of the dielectric function are presented. The $n_j$ and $\kappa_j$ are refractive index and extinction coefficient, respectively, and j is 1 or 2. By boundary conditions, the dispersion relation for a wave propagating on the surface is $$\omega = (ck)^2 \left( \frac{1}{\varepsilon_1} + \frac{1}{\varepsilon_2} \right),$$

where k ($=k'+ik''$), $\omega$ and c are the wave number and the frequency of the wave, the speed of light, respectively. For k' not to be purely imaginary, $\epsilon'_1=(n_1^2-\kappa_1^2)<0$ and $|\epsilon'_1|>\epsilon'_2=(n_2^2-\kappa_2^2)$. Based on this relationship, a graph shown in FIG. 17 was plotted.

Figure 17:
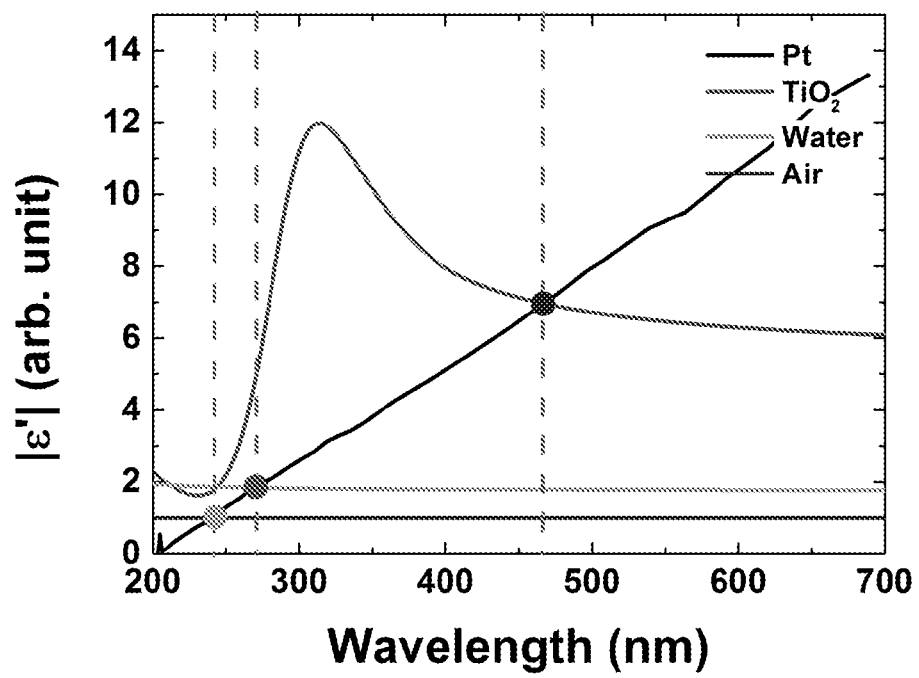
FIG. 17 is a graph of the dielectric function comparison between Pt, $TiO_2$, water, and air.
Figure 18:
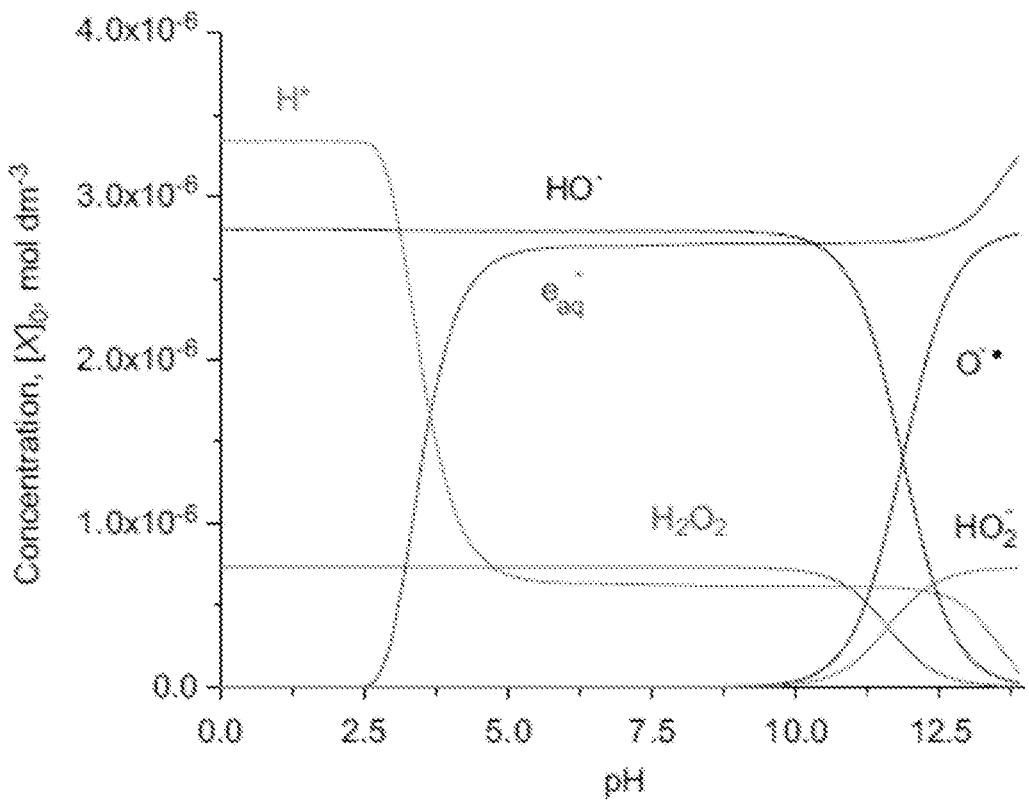
FIG. 18 is a graph of calculated pH dependence and primary product yields in the radiolysis of pure deoxygenated water, $t=10^{-7}$ s, D=10 Gy. T. Palfi et al., Rad. Phys. Chem. 79, 1154 (2010).

Since the surface plasmon energy occurs around $|\epsilon'_1|\approx\epsilon'_2$, the surface plasmon wavelengths can be found from crossing points on the Pt line (the substantially linear relationship line). Compared to the water/Pt interface (dot at the intersection of the Pt line and the water line, which is horizontal intersecting the y-axis at about 2), the air/Pt interface (the dot at the intersection of the Pt line and the air line, which is horizontal intersecting the y-axis at about 1) shows the surface plasmon phenomena at a slightly shorter wavelength. These wavelengths at the crossing points of water/Pt and air/Pt in FIG. 17 are very close to the wavelengths at the strongest reflection peaks (the left dots) as depicted in plots 1 and 4 in FIG. 13. Furthermore, the surface plasmon energy at the Pt/$TiO_2$ interface is consistent with a dip (rights dots) near 450 nm as depicted in FIG. 13. Therefore, matched data from the emission peak shown in plot 4 of FIG. 13 and the left dot shown in FIG. 17 indicate the evidence of plasmon resonant coupling in air/Pt nanoholes under e-beam irradiation. There are only very small amounts of variation among the two layer calculation data (FIG. 17), the multi layer simulation results (FIG. 13, plots 1-3) and the experimental data (FIG. 13, plot 4).

In addition, the electron profiles (FIG. 14 through FIG. 16) showed that the highest electric field intensities can trace electron irradiation paths (electric dipoles), and simultaneously, the electric field intensities in the Pt/nanoporous $TiO_2$ structures are also strengthened near the electron irradiation paths by surface plasmons generated at the Pt nanoholes.

F. Laser Excitation

To understand the surface plasmon effect better on Pt/$TiO_2$, excitation using three different lasers on Pt/$TiO_2$ structure was conducted. Lasers with various colors such as red (650 nm, 1.91 eV), green (532 nm, 2.33 eV), and blue (405 nm, 3.05 eV) were used and the excitation power of all the lasers was 5 mW. The surface plasmon wavelength for the air/Pt interface is found near 250 nm as shown in FIG. 17. Blue laser with a shorter wavelength (more closer to 250 nm) can be coupled better than the other lasers with long wavelengths. The open circuit voltage ($V_{OC}$) and short circuit current ($I_{SC}$) of Pt/$TiO_2$ excited by a blue laser showed the highest values, meaning that hot carriers generated by surface plasmons effectively increases their transportation through the thin $TiO_2$ film, because surface plasmon energy becomes higher than tunneling barrier of Pt/$TiO_2$ as photon energy increases. Therefore, beta radiation having higher energy than these lasers can produce sufficient surface plasmon energy to efficiently transport the hot carriers generated on Pt surface.

G. Discussion

Electrons and holes that migrate to the surface of metal electrodes can reduce and oxidize the reactants adsorbed on the metal surfaces, respectively. The reduction (Red) and oxidation (Ox) reactions can produce the reduction current and oxidation current as shown in the J-V measurement data in FIG. 8. The oxidation current density (lower red curve) is less than reduction current (upper red curve) at 0 V under irradiation, meaning that the reaction Red$\Rightarrow$Ox+ne$^-$ is dominant on Pt/nanoporous $TiO_2$ and available electrons are provided continuously, whereas the current density data of unirradiated devices (upper and lower black lines) seem not much different.

When the strongly localised electric field oscillates across the Pt surface, as illustrated in FIG. 14 through FIG. 16, the displacement of the electron density in the Pt surface by the electric field oscillation generates a Coulombic attraction force that can interact with environmental molecular ions, meaning that the $e_{aq}^-$ and .OH ions surrounded by water molecules can escape and attach to the Pt surface via localised surface plasmons. However, when the localised surface plasmon energy is less than the energy barrier of $e_{aq}^-$ and .OH, they cannot coherently oscillate or escape from their meta-stable state. With respect to the vacuum level, the work functions of $e_{aq}^-$ and .OH were calculated to be 1.6 eV and 7.2 eV, respectively, at pH 0. From the FDTD simulations, a surface plasmon energy of 4.23 eV was determined, which is 1.42 eV from the vacuum level and is higher than the energy level of $e_{aq}^-$, enabling electrons to escape from their meta-stable state and the escaped electrons to generate surface plasmons on the metal surface.

In addition, the presence of excited electrons indicates that excited holes with the same amount of energy (10.64 eV with respect to the vacuum level) exist. These excited holes can interact with .OH on the surface of Pt. In fact, the Schottky junction of Pt/$TiO_2$ creates a space-charge region in the n-type $TiO_2$ layer because the electrons diffuse from the $TiO_2$ side to the Pt side whereas the holes move reversely. In the equilibrium state, an equal amount of electrons in Pt is trapped at the Pt/$TiO_2$ interface and builds up an internal electric field (0.45 eV) from the $TiO_2$ side toward the Pt side, preventing further movement of carriers. When surface plasmons are generated on Pt surface by beta radiation, electrons in Pt are pushed towards $TiO_2$ by the electric field of surface plasmons, which is higher than the internal electric field, and holes move simultaneously towards the Pt/water surface interface. Accumulated holes can attract donors like negatively charged ions or radicals. Thus, the strong electric field enhancement can significantly increase the number of accumulated holes at the Pt/water interface and create a large internal potential difference.

With the energy higher than the potential barrier (0.2~0.5 eV) of surrounding water molecules, solvated electrons ($e_{aq}^-$) can be attracted toward the Pt surface rapidly in water. Moreover, surface plasmons have a resonance frequency of a few hundred of GHz in visible wavelength. It means that strong Coulombic attraction force oscillates very fast to attract $e_{aq}^-$ in water. When the distance between the $TiO_2$ and Pt counter electrode is 5 cm, the electric field is approximately 0.09 V/cm and the speed of electrons in water reaches $1.6256 \times 10^4$ cm/s. If $e_{aq}^-$ in water is 1 mm far away from $TiO_2$, it can move to the $TiO_2$ surface in 603 s and most solvated electrons will not be quickly arrived at the $TiO_2$ electrode. Thus, a slowly saturated curve of open circuit voltage is observed on the TiO$_2$ electrode under beta radiation, while the Pt/TiO$_2$ electrode has very fast saturated curve. The electric field of the TiO$_2$ electrode is much weaker than that of Pt/TiO$_2$ electrode with the surface plasmon effect and the difference in electric field intensity may affect the collection of e$_{aq}^-$ in water. Once e$_{aq}^-$ is arrived at the electrode surface, e$_{aq}^-$ is injected without any energy loss because electrochemical energy is higher than the conduction band edge (−0.1~−0.2 V N$_{HE}$) of TiO$_2$.

In view of the foregoing, the beta radiation produces many free radicals through the loss of kinetic energy in water. Then, the generation of localised surface plasmons on the Pt surface by beta radiation enhances the chemical reactions involving free radicals produced by beta radiation in water. The reflection peak of Pt/nanoporous TiO$_2$ at 5.04 eV and the similarity between the simulated emission spectra and measured reflection spectrum show that the surface plasmon resonance occurs at higher energy than the band gap energy of TiO$_2$, indicating that resonant energy transfer between TiO$_2$ and surface plasmons.

Because the increased population of hot electrons generated by surface plasmons decreases the thickness of the Pt/TiO$_2$ junction and increases its junction electric field, the narrow junction enables carriers obtained from free radicals to efficiently move toward the contact metals without carrier relaxation in the thin film. It was confirmed that much higher power from the device with the plasmonic Pt layer was produced than that from the device without the plasmonic Pt layer. As shown by the laser test, increased surface plasmon energy can effectively transport hot carriers generated on Pt surface. Therefore, it can be concluded that the high power density obtained from the radiolytic cell may be attributed to the conversion of continuously stored free radicals with large electrochemical energy into electricity by the surface plasmon energy generated at the Pt surface.

Example

Titania-Silicon Radiolytic Electrochemical Cell

A. Anode Preparation

Figure 22:
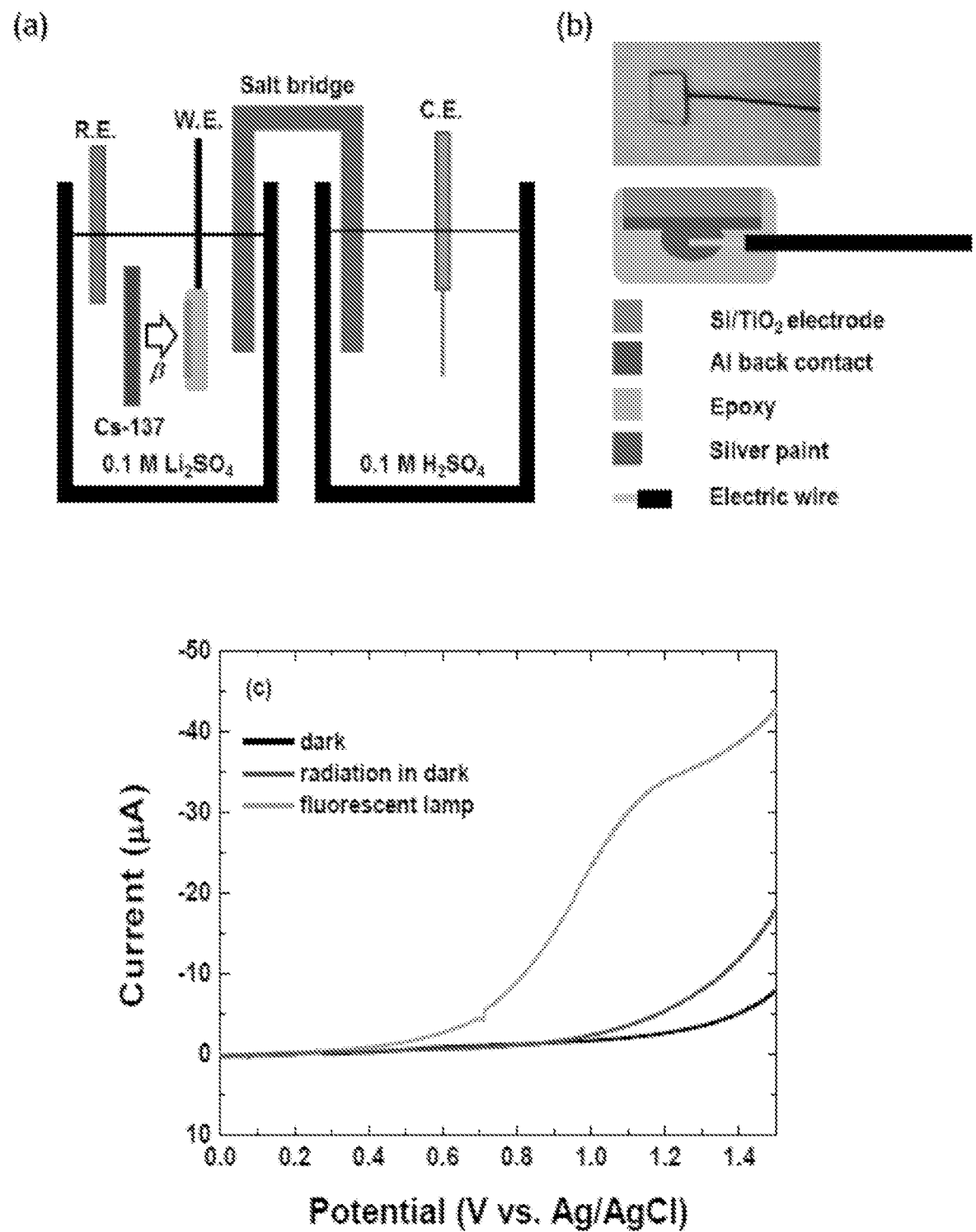
FIG. 22 (a) is a schematic view of testing setup for n-$TiO_2$/n$^+$-Si under the radiation (R.E., W.E., and C.E. are reference, working, and counter electrodes, respectively); (b) is a photograph and schematic diagram of n-$TiO_2$/n$^+$-Si electrode; (c) is the I-V characteristics of $TiO_2$/Si radiocatalytic electrode in a dark room (the lowest plot line), under radiation exposure in a dark room (the middle plot line), and under fluorescent lamp (the uppermost plot line).

Referring to FIGS. 22 (a) and (b), 2 cm×2 cm antimony-doped n+-type (100) Si wafers (0.02-0.04 Ωcm, University Wafer) were initially cleaned with a standard solvent cleaning process. The wafers were then dried with a stream of nitrogen gas and immediately coated with titania nanoparticles (Degussa Corp., P25) suspended in ethanol. The ethanol was evaporated on a hot plate at 100° C. for 3 min. Then, the nanoparticles were annealed in a convection oven at 450° C. for 2 hours. The thickness of the nanoparticle file was about 20 μm. The backside of the Si substrates coated with TiO$_2$ nanoparticles were attached using silver paint with copper wire. To complete the electrodes, the edges and backside of the samples were protected by epoxy to isolate them from contacting the electrolyte.

B. Structural and Optical Properties

Figure 19:
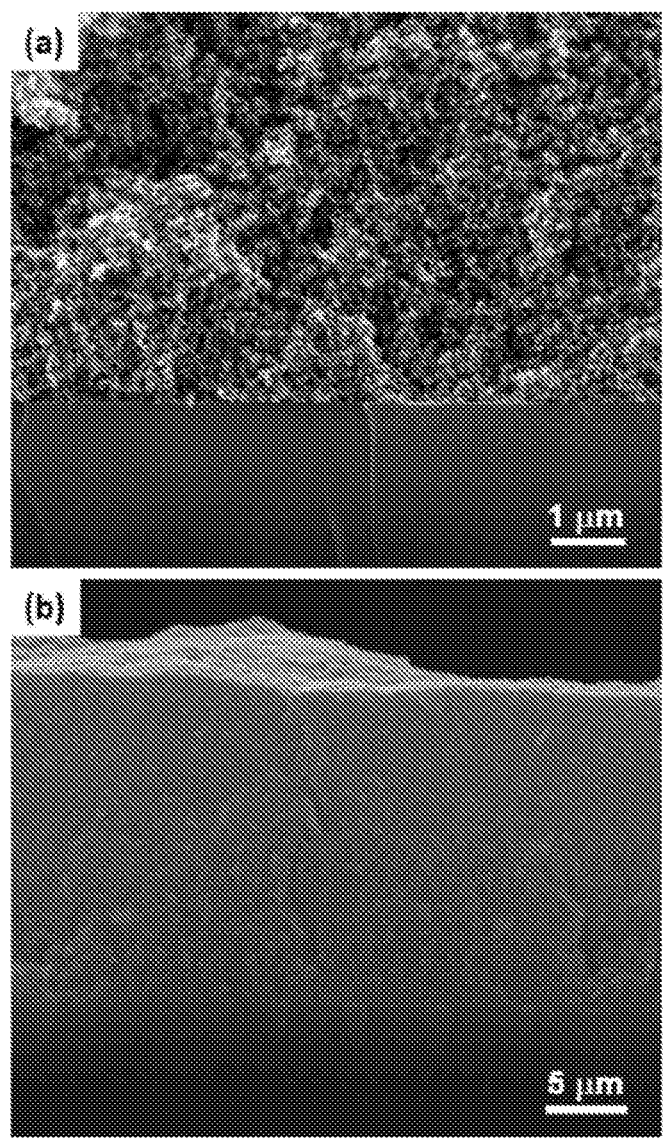
FIG. 19 (a) is a high resolution SEM image of $TiO_2$ nanoparticle film on silicon substrate ("$TiO_2$/Si"), (b) is a low resolution SEM image of $TiO_2$/Si, and (c) an EDS spectrum of $TiO_2$/Si radiocatalytic electrode.
Figure 19:
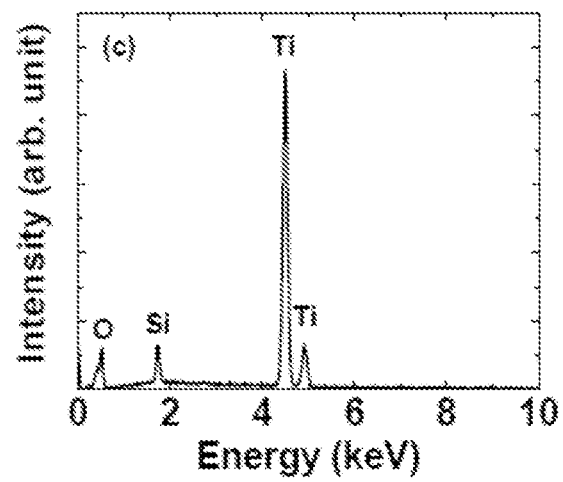

Scanning electron microscopy (SEM) was performed using an FEI Quanta 600 FEG extended vacuum scanning electron microscope with an accelerating voltage of 10 kV and an energy dispersive spectrometer (Noran System Six). X-ray diffraction (XRD) analysis was conducted using a Rigaku Miniflex 600 X-ray diffractometer with Cu Kα radiation. The reflection spectrum was measured using a Perkin-Elmer lambda 25 UV-VIS spectrometer and variable-angle reflectance accessory. Spectrum of a fluorescent lamp was measured by Ocean optics HR2000+ spectrometer. As illustrated in FIG. 19 (c), the EDS spectrum shows that Ti, O, and Si (which comes from the substrate), were observed. This result clearly shows that no other impurities are contained in the TiO$_2$ nanoparticle film.

Figure 20:
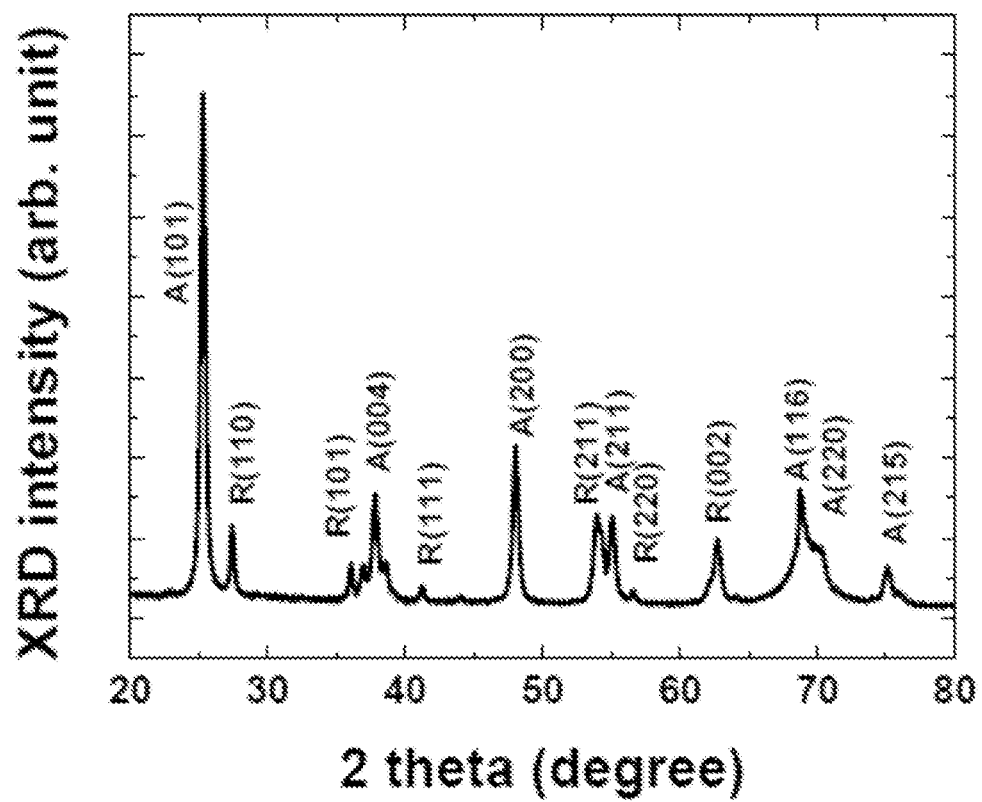
FIG. 20 is XRD data of $TiO_2$/Si, wherein A is for anatase and R is for rutile.

We have studied x-ray diffraction (XRD) analysis because the component ratio and size of nanoparticles significantly affect the enhancement of water splitting at TiO$_2$/electrolyte interface. FIG. 20 shows the x-ray diffraction (XRD) data of the TiO$_2$ nanoparticle film. The XRD data shows many peaks corresponding to both crystal structures of anatase and rutile. The presence of two crystalline phases can be understood by the fact that the original material is a mixture of anatase and rutile. The anatase (101) peak and the rutile (110) peak were analyzed using the formula $$x = \left(1 + 0.8\frac{I_A}{I_R}\right)^{-1},$$

where IA and IR are the x-ray intensities of the anatase and rutile peaks, respectively. Estimated weight percentages of anatase and rutile are 82% and 18%. Average crystalline sizes were calculated by Scherrer's formula given by L$_c$=kl/bcosq, where k (0.94) and l (Cu kα1=0.1540593 nm) are related to the shape of polycrystals and the x-ray wavelength, b and q are the full-width at half maximum (FWHM) of the respective diffraction peak and Bragg angle. To obtain the value of the FWHM of a peak from the XRD data, the observed diffraction patterns were fitted by a Gaussian function. Hence, the particle sizes of anatase and rutile TiO$_2$ were about 20.3 nm and 28.4 nm, respectively.

C. Energy Absorption of Electron Beam Using Numerical Simulation

In order to understand the energy loss of the beta radiation in TiO$_2$ (band gap: 3.2 eV), the absorbed energy in the aqueous solution was calculated using Monte Carlo (MC) simulations. The number of electrons utilized in this simulation was 100,000 and the kinetic energy of electron beam was 1.176 MeV. A beta particle is an electron (e$^-$) or a positron (e$^+$), and is generated when the neutron to proton ratio is unstable. Although radioisotope $^{137}$Cs emits beta particles (electrons, 1.176 MeV) and gamma rays (661.6 keV), it was assumed that it emits only beta particles for this simulation. Since gamma rays are high energy photons, gamma rays can excite high energy electrons due to Compton scattering and photoelectric absorption in semiconductor and then these energetic electrons lose their energy in the material via electron-electron collision and the creation of various excitations. However, the mass attenuation coefficients of gamma rays (661.6 keV) are about 0.0778 cm$^2$/g for Si and about 0.028 cm$^2$/g for TiO$_2$, while the mass absorption coefficient for beta particles (1.176 MeV) is about 14.13 cm$^2$/g. The mass attenuation and absorption coefficients (μ) are related to $$\mu = -\frac{1}{t}\frac{N(t)}{N_0},$$

wherein N$_0$ and N(t) are the initial number of beta particles or photons and their numbers at thickness t of semiconductor, respectively. Therefore, the effect of gamma ray in this simulation may be excluded because the interaction of gamma ray with semiconductor is much less than that of beta particles with semiconductor.

Figure 21:
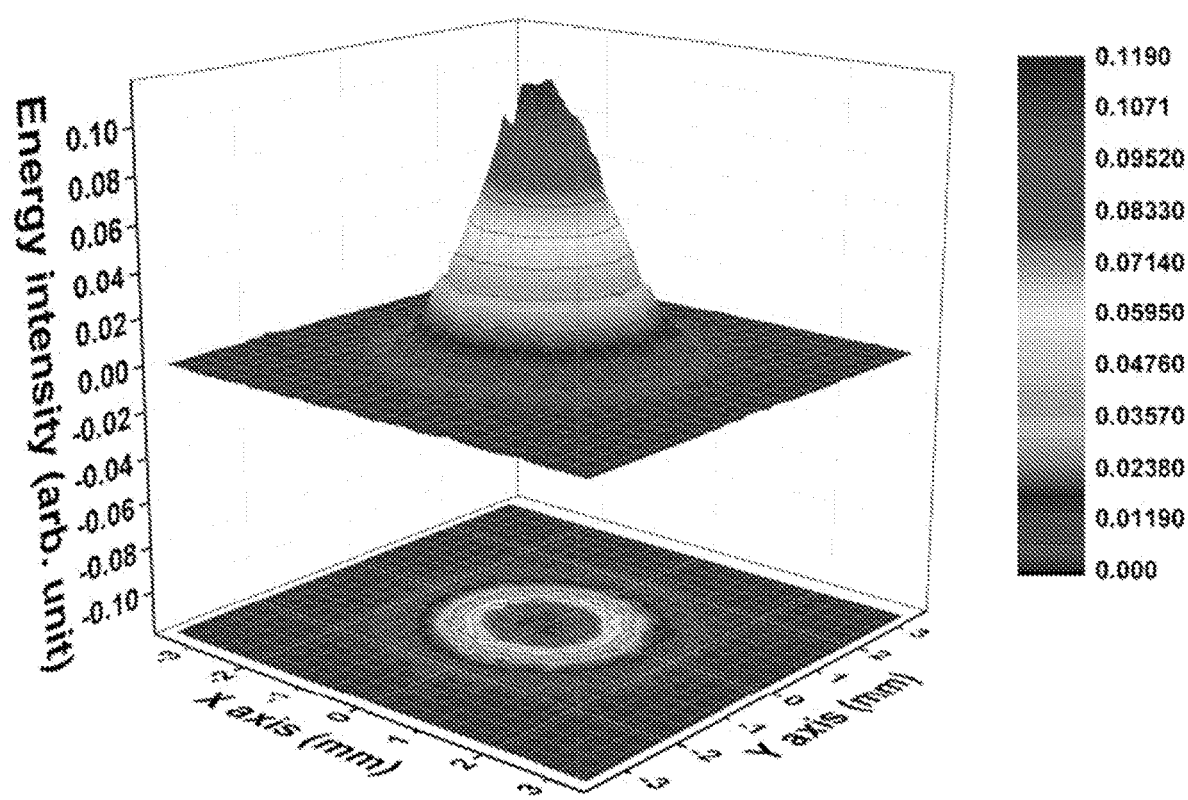
FIG. 21 (a) is an absorbed energy distribution of electron beams at the interface with water and (b) is absorbed energy in $TiO_2$ film and Si substrate using MC simulation.
Figure 21:
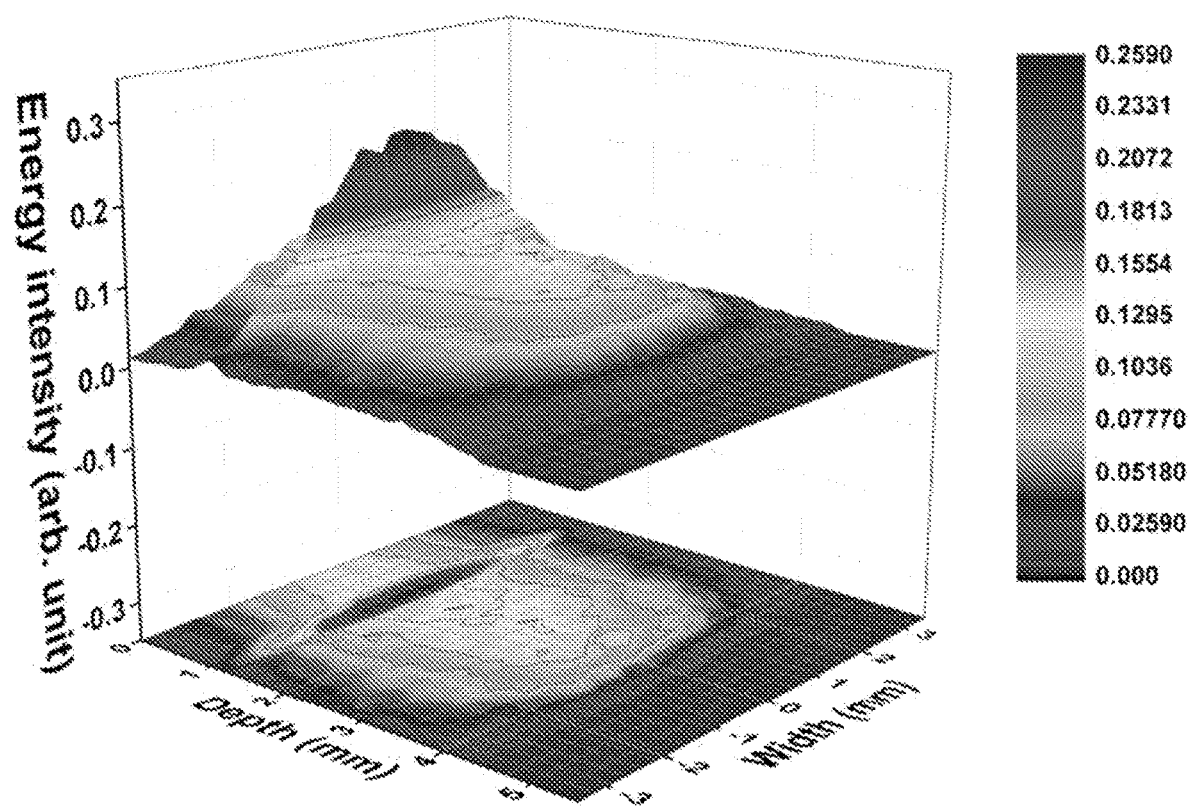

For mimicking our real testing setup, the diameter of the electron beam was 7.5 mm and the beam source was set to be 1 mm away from electrode in water. The electrode consisted of $TiO_2$ (10 μm), silicon (300 μm), and epoxy (2 mm). Note that this simulation ignored the presence of secondary electrons generated by primary electrons. FIG. 21 (a) is the absorbed energy distribution of the electron beam at the interface with water. The absorbed energy intensity at the center of the electron beam was much higher than that of the outside of beam because the electron beam is defined by a Gaussian distribution. As shown in FIG. 21 (b), the absorbed energies in the $TiO_2$ film and Si substrate were calculated to be about 4.5% and 13.5% of the total energy of the electron beam, respectively. In the middle of water, the absorbed energy was also about 24.9%. The last of electrons stop in the middle of epoxy passing through $TiO_2$/Si. When the radioactivity is 5 μCi, the total number of beta particles per unit time is estimated to be $0.925 \times 10^5$ s$^{-1}$. Total input power density of beta particles was estimated to be 30.757 nW/cm$^2$. Here, incident beta particles with a high energy can excite electrons in semiconductor via interaction. Under high energy radiation, these interactions require the beta particle to give up its energy in the quantity defined as the electron and hole pair (EHP) ionization energy, given by $W_\pm \approx 2.8 E_g + E_{ph}$, where $E_g$ and $E_{ph}$ are the band gap and phonon energies (0.5<Eph<1 eV), respectively. For $TiO_2$, $W_\pm$ is about 9.46 eV. When a beta particle through TiO2 (20 μm), the number of generated EHPs is estimated to be around 5594 per single beta particle by a ratio of absorbed energy of beta particles to EHP ionization energy in $TiO_2$ and the power deposition is estimated by 1.384 nW/cm$^2$. For Si (300 μm), additionally, $W_\pm$ is about 3.6 eV and the number of generated EHPs and deposition power are about 44100 and 4.152 nW/cm$^2$, respectively. However, the majority of EHPs generated more than one diffusion length away from the depletion region will recombine before separation by the built-in potential. Since $TiO_2$ film consists of nanoparticles, the diffusion length is much shorter than that of Si, which has single-crystalline structure. In spite of the short depletion region of n$^+$-Si, hence, many of photocarriers generated inside the silicon substrate can be moved to the depletion region and back electrode due to the long diffusion length in Si. This means that many of the EHPs produced in $TiO_2$ and Si can be employed to generate the electricity in our testing setup.

D. Electrical Properties

For measuring radio- and photo-current, the testing setup and electrode configuration is schematically shown in FIGS. 22 (a) and (b). The I-V measurements were taken from 1.5 V to −1.5 V with respect to Ag/AgCl reference electrodes in a three-electrode system at a fixed scan rate of 0.05 V/s. The respective electrolyte solutions were lithium sulfate ($Li_2SO_4$, Sigma Aldrich, 99%) and sulfuric acid ($H_2SO_4$, Sigma Aldrich, 95-98%). A salt bridge filled with 1 M KCl solution was used between two half cells. A sealed radioisotope standard source (137Cs, 5 μCi, Pasco) was selected. The distance from the electrode to the radiation source was determined to be about 1 mm for keeping a constant activity of 5 μCi at the surface of the device. A potentiostat (DY2322, Digi-Ivy) was connected with the three (reference, counter, and working) electrodes for data collection. All experiments were performed in a dark room for eliminating the effects from photocurrent. In addition, to confirm the reaction with only diffused radicals, agitation was not used in the solution.

FIG. 22 (c) shows the current versus bias potential (I-V) characteristics for the $TiO_2$/Si radiocatalytic electrode. For comparison, the I-V characteristics of $TiO_2$/Si electrode were measured under a fluorescent lamp with light intensity 6.6 mW/cm$^2$, measured using a calorimeter (Scientech, AC5000) in the range of 200 nm to 1100 nm. Above the band gap of $TiO_2$, the absorbable wavelengths (<387.5 nm) in $TiO_2$ are about 8.86% of whole emitting light of fluorescent lamp, meaning absorbable power intensity is about 584.76 μW/cm$^2$. The average absorbable power intensity of the Si substrate was calculated to be about 6.5% (428.957 μW/cm$^2$). At 1.5 V, the current in the $TiO_2$/Si electrode was more photocurrent (−42.6 μA, the uppermost plot) than radiocurrent (−18.2 μA, the middle plot). The dark current (the lower plot) was −8.05 μA at 1.5 V. Note that the active area of radiation is about 44.2% of photo-active area because of narrower electron beam diameter. Although a huge amount of input photon energy was supplied and absorbed in $TiO_2$/Si electrode compared to input radiation energy, photo-current was not much different from radio-current at 1.5 V. One possible reason for the enhanced radio-current is that the spectrum of fluorescent lamp has wider wavelengths, below the band gap of $TiO_2$, indicating no absorption in this material, and low absorption in the Si substrate due to the thick $TiO_2$ film. Meanwhile, the EHP ionization energy of beta particles in each material can easily excite electrons in material because it is much higher than band gap energy of each material. Another possible reason is the multiple generation of EHPs in the electrode by kinetic energy loss of beta particles. These results imply that beta particles are a better source compared to normal light to generate electricity through water splitting.

E. Generation of Free Radicals

Furthermore, the generation of free radicals by water radiolysis was evaluated. High energy electrons passing through an aqueous solution can ionize or excite water molecules forming a number of transition species and stable products, as given by

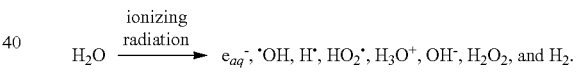

$$H_2O \xrightarrow{\text{ionizing radiation}} e_{aq}^-, \cdot OH, H\cdot, HO_2\cdot, H_3O^+, OH^-, H_2O_2, \text{ and } H_2.$$

Figure 23:
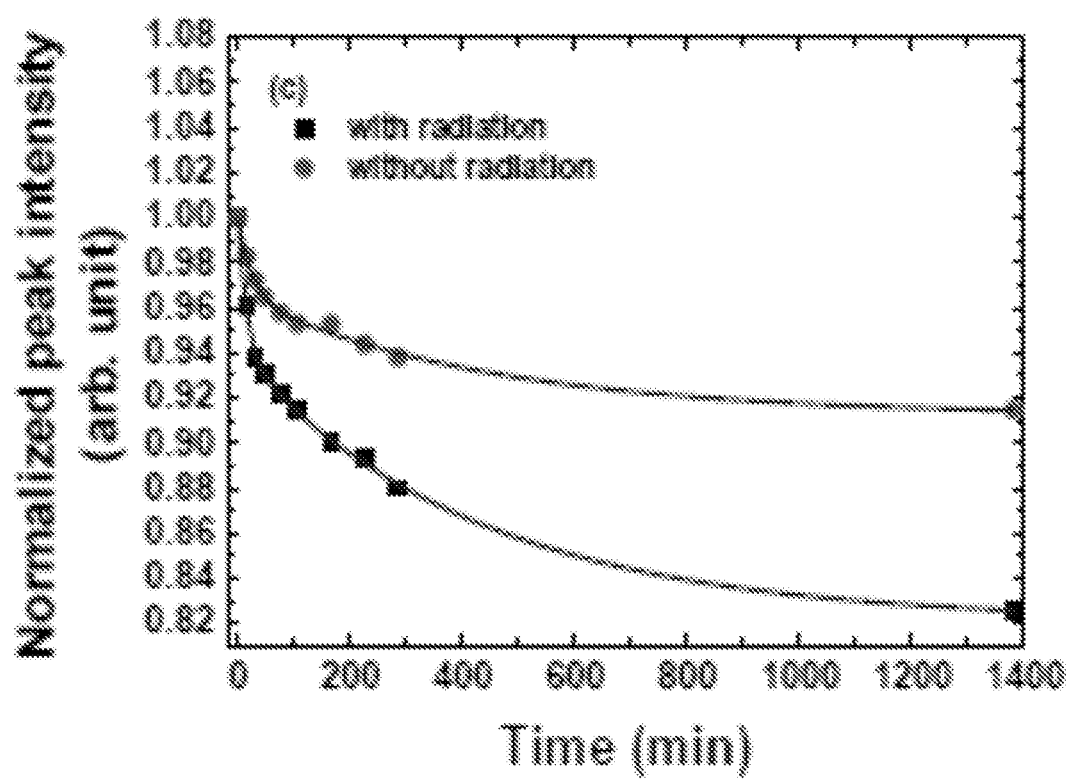
FIG. 23 is the normalized time-dependent degradation of methylene blue in 0.1 M $Li_2SO_4$ aqueous solution with radiation exposure and without radiation exposure at different time intervals.

A lot of molecules of the given products are formed by the absorption of 100 eV in the medium. The generated radicals are powerful redox reagents; i.e., $e_{aq}^-$ is a strong reducing agent, H. is an equally strong reducing and oxidizing agent and .OH is a powerful oxidizing agent. In order to understand radiolytic activity of aqueous solutions, the radiolytic decolorization of 5 mg/L Methylene Blue (MB, $C_{16}H_{18}ClN_3S$) aqueous solution having 0.1 M $Li_2SO_4$ electrolyte was evaluated by UV-VIS spectrometer. A 20 ml sample of this dye solution was placed in a bottle under $^{137}$Cs radiation and the absorption spectra were measured to determine the concentration of MB as a function of time with a reference. There were unique peaks of 292 nm, 613 nm, and 663 nm in MB solution. Those peak intensities of both solutions were gradually dropped with increasing time. The rate of decolorization was estimated in terms of change in intensity at λmax=663 nm, as shown in FIG. 23. After radiation for 1380 minutes, the absorption peak of MB aqueous solution at 663 nm decreased by 91.46% for no radiation and 82.58% for radiation, respectively. When dye reacts with free radicals, degradation products are created and subsequently the color of MB is diluted. The reaction rates of MB and free radicals are described by the equation, $y=y_0+A_1 \exp(-k_1 t)+A_2 \exp(-k_2 t)$, where $k_1$ and $k_2$ are reaction rates of two degradation products and t is time. These results could be attributed to free radicals of .OH and $SO_4.^-$ formed in $Li_2SO_4$ aqueous solution by both a thermally-activated persulfate oxidation and radiation exposure. Through thermal activation, persulfate can be activated by $S_2O_8^{2-}$+heat→$2SO_4.^-$ and then hydroxyl radicals can be generated with by $SO_4.^-+H_2O→SO_4^{2-}+.HO+H^+$. These radicals can cause the degradation of MB. As shown in Table C, below, because $k_1$ for radiation exposure of MB is similar to k1 for no radiation exposure of MB but k2 for radiation exposure of MB is higher by 47.5% compared to $k_2$ for no radiation exposure of MB, it is believed that $k_1$ and $k_2$ could be related to $SO_4.^-$ and .OH, respectively. Additionally, amplitude $A_1$ and $A_2$ for radiation exposure of MB is higher about 122.0% and 76.2% when compared to those for no radiation exposure of MB. These free radicals produced in an aqueous solution by radiation can strongly increase the catalytic activity with .OH generated by excited electrons in $TiO_2$. Therefore, the significant increment of generated current under radiation exposure is because .OH and $SO_4.^-$ radicals formed in water by radiation could affect the increase in radiocatalytic activity on $TiO_2$/Si electrode.

TABLE C

Comparison of rate constants and amplitude for the degradation of methylene blue in 0.1M $Li_2SO_4$ aqueous solution.

| | $A_1$ | $A_2$ | $k_1$ (min$^{-1}$) | $k_2$ (min$^{-1}$) |
|---|---|---|---|---|
| Radiation | 0.11823 (±0.00296) | 0.06107 (±0.00324) | 0.00234 (±1.895 × 10$^{-4}$) | 0.06212 (±0.00704) |
| No radiation | 0.05325 (±0.00417) | 0.03466 (±0.00486) | 0.00232 (±6.081 × 10$^{-4}$) | 0.04210 (±0.01068) |

The radiocatalytic effect of the $TiO_2$/Si electrode was demonstrated. The radiocatalytic chemical cell has shown larger generation of current than a photocatalytic chemical cell. Due to enhanced energy absorption of the $TiO_2$ nanoparticle film using high electron-hole pair ionization energy, and multiplication of electron-hole pairs and free radicals generated by kinetic energy loss of beta particles, the performance of the radiocatalytic cell was significantly enhanced.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A radiolytic electrochemical system comprising:
    (a) a cathode;
    (b) an anode that comprises:
        (i) a semiconductor component, wherein the semiconductor component has a nanoscale morphology that comprises nanopores that have an average diameter in a range 10 nm to 500 nm, wherein the nanopores are spaced a distance apart that is in a range of 10 nm to 500 μm; and
        (ii) a conduction component comprising an ohmic metal in contact with the semiconductor component thereby forming a non-rectifying metal-semiconductor junction; and
    (c) an aqueous electrolyte solution in contact with the cathode and the anode, but not the conduction component of the anode, wherein solvated free radical ions are formed in the aqueous electrolyte solution when it is subjected to ionizing radiation of sufficient energy to split water molecules therein; and
    (d) ionizing radiation, some of which splits water molecules in the aqueous electrolyte solution to form positively and negatively charged free radical ions that are solvated in the aqueous electrolyte solution; and
wherein negatively charged solvated free radical ions are released from their surrounding water molecules and participate in redox reactions at the cathode/solution interface and positively charged solvated free radical ions are released from their surrounding water molecules and participate in redox reactions at the anode/solution interface thereby producing electrical current capable of performing work when the anode and cathode are electrically connected.

2. The radiolytic electrochemical system of claim 1, wherein some of the ionizing radiation forms electron-hole pairs in the semiconductor component that separate with holes migrating to, and participating in, the redox reactions at the anode/solution interface and electrons migrating to, and participating in, the redox reactions at the cathode/solution interface thereby contributing to the electrical current.

3. The radiolytic electrochemical system of claim 1, wherein:
    the semiconductor component comprises large band gap semiconductor material selected from the group consisting of $TiO_2$, Si, SiC, GaN, GaAs, ZnO, $WO_3$, $SnO_2$, $SrTiO_3$, $Fe_2O_3$, CdS, ZnS, CdSe, GaP, $MoS_2$, ZnS, $ZrO_2$, and $Ce_2O_3$, and combinations thereof, and has a thickness that is in a range of 10 nm to 500 μm;
    the ohmic metal is selected from the group consisting of Al, Ag, Ti, Ni, Au, Fe, Cr, Pt, Pb, Mo, and Cu, alloys thereof, and combinations of the foregoing metallic elements and/or alloys;
    the cathode comprises a cathode metal selected from the group consisting of Pt, Au, Pd, Fe, Cr, Co, Ni, Ag, Ti, Ru, Cu, Mo, and Ir, alloys thereof, and combinations of the foregoing metallic elements and/or alloys and the cathode has a nanoscale morphology that creates localized surface plasmons when the cathode is subjected to some of the ionizing radiation, wherein some of the plasmons assist in the release of the negatively charged solvated free radical ions from their surrounding water molecules for participation in the redox reactions at the cathode/solution interface thereby contributing to the electrical current.

4. The radiolytic electrochemical system of claim 3, wherein the semiconductor component comprises structures selected from the group consisting of nanowires, nanorods, nanotubes, sintered nanoparticles, nanosheets, nanometer-thick films, and combinations thereof, and the semiconductor nanopores correspond to the separations between said structures.

5. The radiolytic electrochemical system of claim 1, wherein:
    the anode further comprises (iii) a Schottky component comprising a Schottky metal in contact with the semiconductor component thereby forming a rectifying metal-semiconductor junction;

the Schottky metal is selected from the group consisting of Pt, Au, Pd, Fe, Co, Cr, Ni, Ag, Ti, Ru, Cu, Mo, Ir, and Rh, alloys thereof, and combinations of the foregoing metallic elements and/or alloys;

the Schottky component has a nanoscale morphology that creates localized surface plasmons when the Schottky component is subjected to some of the ionizing radiation, wherein some of the plasmons form electron-hole pairs in the Schottky component that separate, and the Schottky component has a thickness that allows for holes to migrate to, and participate in, the redox reactions at the anode/solution interface and electrons to migrate via the semiconductor component and the conduction component to, and participate in, the redox reactions at the cathode/solution interface thereby contributing to the electrical current, and wherein some of the plasmons assist in the release of the positively charged solvated free radical ions from their surrounding water molecules for participation in the redox reactions at the anode/solution interface thereby contributing to the electrical current; the thickness of the Schottky component is in a range of 1 nm to 100 nm; and the nanoscale morphology of the Schottky component comprises nanopores that have diameters that provide optimum surface Plasmon resonance within a wavelength range of 100 nm to 800 nm and said nanopores have an average diameter in a range 10 nm to 500 nm, and said nanopores are spaced a distance apart that is in a range of 10 nm to 500 nm.

6. The radiolytic electrochemical system of claim 1, wherein:

the semiconductor component is selected from the group consisting of intrinsic semiconductor (i), n-type semiconductor (n), $n^+$-type semiconductor ($n^+$), p-type semiconductor (p), $p^+$-type semiconductor ($p^+$), and combinations thereof;

the semiconductor component has a structure selected from the group consisting of n, p, n-p, p-$p^+$, n-$n^+$, n-i-p, and $n^+$-n-i-p-$p^+$; and the aqueous solution has a basic pH in the event a n-type semiconductor and/or $n^+$-type semiconductor is in contact with the aqueous electrolyte solution; or an acid pH in the event a p-type semiconductor and/or $p^+$-type semiconductor is in contact with the aqueous electrolyte solution, thereby forming a stable rectifying junction at the semiconductor component-solution interface.

7. The radiolytic electrochemical system of claim 1, wherein:

the ionizing radiation is from a radiation source that is a beta particle emitting radioisotope selected from the group consisting of $^{63}$Ni, $^{90}$Sr, $^{35}$S, $^{204}$Tl, and $^3$H, $^{148}$Gd, and $^{137}$Cs or an alpha particle emitting radioisotope selected from the group consisting of $^{210}$Po, $^{244}$Cm, $^{238}$Pu, and $^{241}$Am;

wherein radiation source is encapsulated by a protective layer and at least a portion of the protective layer is in contact with the aqueous electrolyte solution, wherein the protective layer prevents chemical reactions between the radiation and the aqueous electrolyte solution;

wherein the radiation source is spaced from the anode a distance that is at least sufficient to prevent or limit lattice damage to the semiconductor component and no greater than the distance the ionizing radiation can travel in the aqueous electrolyte solution; and the electrochemical cell is at least substantially sealed and the cathode, the anode, the encapsulated radiation source, and the aqueous electrolyte solution are within the at least substantially sealed electrochemical cell.

8. The radiolytic electrochemical system of claim 1, wherein the ionizing radiation is from a radiation source that is not in contact with the aqueous electrolyte solution, and wherein the cathode, the anode, and the aqueous electrolyte solution are within an at least substantially sealed container through which the ionizing radiation from the radiation source passes.

9. The radiolytic electrochemical system of claim 1, wherein the aqueous electrolyte solution further comprises a redox compound that provides a redox couple that participates in the redox reactions at the cathode/solution interface and the anode/solution interface thereby reducing or eliminating the production of one or more gaseous products, and wherein the redox compound and the redox couple, respectively, are selected from the group consisting of $ZnSO_4$ [$Zn^+|Zn^{2+}$], $CoSO_4$ [$Co^+|Co^{2+}$], $CdSO_4$ [$Cd^+|Cd^{2+}$], $TlSO_4$ [$Tl^0|Tl^+$], $Pb(ClO_4)_2$ [$Pb^+|Pb^{2+}$], $NiSO_4$ [$Ni^+|Ni^{2+}$], and $Cr(ClO_4)_3$ [$Cr^+|Cr^{3+}$].

\* \* \* \* \*